United States Patent
Huang et al.

(10) Patent No.: US 12,028,861 B2
(45) Date of Patent: Jul. 2, 2024

(54) PHYSICAL UPLINK CONTROL CHANNEL REPETITION ACROSS MULTIPLE COMPONENT CARRIERS

(71) Applicant: QUALCOMM Incorporated, San Diego, CA (US)

(72) Inventors: Yi Huang, San Diego, CA (US); Mostafa Khoshnevisan, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 363 days.

(21) Appl. No.: 17/444,540

(22) Filed: Aug. 5, 2021

(65) Prior Publication Data

US 2023/0038855 A1    Feb. 9, 2023

(51) Int. Cl.
| | |
|---|---|
| *H04W 4/00* | (2018.01) |
| *H04L 1/08* | (2006.01) |
| *H04L 5/14* | (2006.01) |
| *H04W 72/21* | (2023.01) |
| *H04W 72/044* | (2023.01) |

(52) U.S. Cl.
CPC .............. *H04W 72/21* (2023.01); *H04L 1/08* (2013.01); *H04L 5/14* (2013.01); *H04W 72/044* (2013.01)

(58) Field of Classification Search
CPC ..................... H04L 1/08; H04L 5/14
See application file for complete search history.

(56) References Cited

U.S. PATENT DOCUMENTS

| | | | | |
|---|---|---|---|---|
| 2015/0305016 A1* | 10/2015 | Dai | ........................ | H04L 5/0098 370/280 |
| 2016/0143035 A1* | 5/2016 | Xue | ........................ | H04L 5/001 370/329 |
| 2019/0230683 A1* | 7/2019 | Akkarakaran | .... | H04W 72/1268 |
| 2019/0313436 A1* | 10/2019 | Lee | ........................ | H04L 5/0051 |
| 2020/0029335 A1 | 1/2020 | Yang et al. | | |

(Continued)

FOREIGN PATENT DOCUMENTS

| | | | | |
|---|---|---|---|---|
| CA | 3155060 C | * | 3/2023 | .......... H04W 74/006 |
| WO | WO-2020006027 A1 | | 1/2020 | |
| WO | WO-2021062209 A1 | | 4/2021 | |

OTHER PUBLICATIONS

Partial International Search Report—PCT/US2022/074422—ISA/EPO—dated Nov. 16, 2022.

(Continued)

*Primary Examiner* — Elisabeth Benoit Magloire
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may transmit an initial physical uplink control channel (PUCCH) repetition, of a plurality of PUCCH repetitions, on a first component carrier of a plurality of component carrier for which PUCCH switching is enabled. The UE may select a second component carrier, of the plurality of component carriers for which PUCCH switching is enabled, that is to be used for transmitting a second PUCCH repetition of the plurality of PUCCH repetitions. The UE may transmit the second PUCCH repetition on the second component carrier. Numerous other aspects are provided.

24 Claims, 12 Drawing Sheets

(56) References Cited

U.S. PATENT DOCUMENTS

| | | | |
|---|---|---|---|
| 2020/0053778 A1* | 2/2020 | Babaei | H04W 48/12 |
| 2020/0092068 A1 | 3/2020 | Yang et al. | |
| 2021/0022176 A1* | 1/2021 | Yang | H04L 5/0098 |
| 2021/0029708 A1* | 1/2021 | Khoshnevisan | H04W 80/02 |
| 2021/0185632 A1* | 6/2021 | Manolakos | H04L 5/0094 |
| 2021/0360616 A1* | 11/2021 | Yi | H04L 5/0012 |
| 2022/0116172 A1* | 4/2022 | Tang | H04L 5/0098 |
| 2022/0131677 A1* | 4/2022 | Lin | H04L 5/0082 |
| 2022/0303966 A1* | 9/2022 | Deghel | H04W 72/23 |
| 2022/0304043 A1* | 9/2022 | Fu | H04W 72/23 |
| 2022/0322357 A1* | 10/2022 | Deghel | H04W 72/1263 |
| 2023/0137292 A1* | 5/2023 | Zhang | H04W 72/563 370/329 |
| 2023/0155749 A1* | 5/2023 | Yang | H04L 1/1861 370/329 |
| 2023/0189241 A1* | 6/2023 | Go | H04W 52/242 |
| 2023/0198682 A1* | 6/2023 | Khoshnevisan | H04L 1/08 370/329 |
| 2023/0284222 A1* | 9/2023 | Sun | H04L 1/0067 370/329 |
| 2023/0345465 A1* | 10/2023 | Fakoorian | H04W 72/20 |
| 2024/0032041 A1* | 1/2024 | Dai | H04L 1/1861 |

OTHER PUBLICATIONS

Ericsson: "HARQ-ACK Enhancements for IIoT/URLLC", 3GPP TSG-RAN WG1 Meeting #105-e, R1-2104217, 3RD Generation Partnership Project (3GPP), Mobile Competence Centre, 650, Route Des Lucioles, F-06921 Sophia-antipolis Cedex, France, May 12, 2021, XP052010677, 7 Pages, Section 2.6.

International Search Report and Written Opinion—PCT/US2022/074422—ISA/EPO—dated Feb. 8, 2023.

ZTE: "Discussion on HARQ-ACK Enhancements for eURLLC", 3GPP TSG RAN WG1 Meeting #105-e, R1-2104326, 3RD Generation Partnership Project, Mobile Competence Centre, 650, Route Des Lucioles, F-06921 Sophia-Antipolis Cedex France, vol. RAN WG1, No. e-Meeting, May 10, 2021-May 27, 2021, May 12, 2021, XP052010761, pp. 1-10, Figure 2, Section 3.1.

\* cited by examiner

PHYSICAL UPLINK CONTROL CHANNEL REPETITION ACROSS MULTIPLE COMPONENT CARRIERS

FIELD OF THE DISCLOSURE

Aspects of the present disclosure generally relate to wireless communication and specifically, to techniques and apparatuses for physical uplink control channel (PUCCH) repetition across multiple component carriers.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

Conventionally, physical uplink control channel (PUCCH) repetitions are permitted only on a primary component carrier of a PUCCH group configured for the UE. However, permitting PUCCH repetitions only on the primary component carrier can result in undesirable delay associated with transmitting PUCCH repetitions. For example, a PUCCH resource configuration for the primary component carrier may indicate that a given slot is a downlink slot (for example, a slot in which only downlink transmissions can be communicated) or a slot including a set of downlink symbols, a set of guard symbols, and a set of uplink symbols, where the set of uplink symbols is insufficient to carry a PUCCH repetition. In such examples, the UE has to wait to transmit a given PUCCH repetition until a slot on the primary component carrier has sufficient available uplink symbols. Such a delay is particularly undesirable for a type of communication with high-reliability or low-latency requirements, such as ultra-reliable low-latency communication (URLLC).

SUMMARY

Some aspects described herein relate to a method of wireless communication performed by a user equipment (UE). The method may include transmitting an initial physical uplink control channel (PUCCH) repetition on a first component carrier of a plurality of component carriers for which PUCCH switching is enabled. The method may include selecting a second component carrier, of the plurality of component carriers for which PUCCH switching is enabled, that is to be used for transmitting a second PUCCH repetition of the plurality of PUCCH repetitions. The method may include transmitting the second PUCCH repetition on the second component carrier.

Some aspects described herein relate to a method of wireless communication performed by a UE. The method may include determining whether uplink symbols on a primary component carrier, of a plurality of component carriers for which PUCCH switching is enabled, are sufficient to permit any PUCCH repetition, of a plurality of PUCCH repetitions, to be transmitted in a plurality of consecutive slots on the primary component carrier. The method may include selecting a component carrier, of the plurality of component carriers, that is to be used for transmitting one or more PUCCH repetitions of the plurality of PUCCH repetitions based at least in part on the determination of whether uplink symbols on the primary component carrier are sufficient to permit any PUCCH repetition of the plurality of PUCCH repetitions to be transmitted in the plurality of consecutive slots. The method may include transmitting the one or more PUCCH repetitions on the selected component carrier.

Some aspects described herein relate to a UE for wireless communication. The user equipment may include at least one processor and at least one memory, communicatively coupled with the at least one processor, that stores processor-readable code. The processor-readable code, when executed by the at least one processor, may be configured to cause the user equipment to transmit an initial PUCCH repetition on a first component carrier of a plurality of component carriers for which PUCCH switching is enabled. The processor-readable code, when executed by the at least one processor, may be configured to cause the user equipment to select a second component carrier, of the plurality of component carriers for which PUCCH switching is enabled, that is to be used for transmitting a second PUCCH repetition of the plurality of PUCCH repetitions. The processor-readable code, when executed by the at least one processor, may be configured to cause the user equipment to transmit the second PUCCH repetition on the second component carrier.

Some aspects described herein relate to a UE for wireless communication. The user equipment may include at least one processor and at least one memory, communicatively coupled with the at least one processor, that stores processor-readable code. The processor-readable code, when executed by the at least one processor, may be configured to cause the user equipment to determine whether uplink symbols on a primary component carrier, of a plurality of component carriers for which PUCCH switching is enabled, are sufficient to permit any PUCCH repetition, of a plurality of PUCCH repetitions, to be transmitted in a plurality of consecutive slots on the primary component carrier. The processor-readable code, when executed by the at least one processor, may be configured to cause the user equipment to select a component carrier, of the plurality of component carriers, that is to be used for transmitting one or more PUCCH repetitions of the plurality of PUCCH repetitions based at least in part on the determination of whether uplink symbols on the primary component carrier are sufficient to permit any PUCCH repetition of the plurality of PUCCH repetitions to be transmitted in the plurality of consecutive slots. The processor-readable code, when executed by the at least one processor, may be configured to cause the user equipment to transmit the one or more PUCCH repetitions on the selected component carrier.

Some aspects described herein relate to a non-transitory computer-readable medium that stores a set of instructions for wireless communication by a UE. The set of instructions, when executed by one or more processors of the UE, may cause the UE to transmit an initial PUCCH repetition on a first component carrier of a plurality of component carriers for which PUCCH switching is enabled. The set of instructions, when executed by one or more processors of the UE, may cause the UE to select a second component carrier, of the plurality of component carriers for which PUCCH switching is enabled, that is to be used for transmitting a second PUCCH repetition of the plurality of PUCCH repetitions. The set of instructions, when executed by one or more processors of the UE, may cause the UE to transmit the second PUCCH repetition on the second component carrier.

Some aspects described herein relate to a non-transitory computer-readable medium that stores a set of instructions for wireless communication by a UE. The set of instructions, when executed by one or more processors of the UE, may cause the UE to determine whether uplink symbols on a primary component carrier, of a plurality of component carriers for which PUCCH switching is enabled, are sufficient to permit any PUCCH repetition, of a plurality of PUCCH repetitions, to be transmitted in a plurality of consecutive slots on the primary component carrier. The set of instructions, when executed by one or more processors of the UE, may cause the UE to select a component carrier, of the plurality of component carriers, that is to be used for transmitting one or more PUCCH repetitions of the plurality of PUCCH repetitions based at least in part on the determination of whether uplink symbols on the primary component carrier are sufficient to permit any PUCCH repetition of the plurality of PUCCH repetitions to be transmitted in the plurality of consecutive slots. The set of instructions, when executed by one or more processors of the UE, may cause the UE to transmit the one or more PUCCH repetitions on the selected component carrier.

Some aspects described herein relate to an apparatus for wireless communication. The apparatus may include means for transmitting an initial PUCCH repetition on a first component carrier of a plurality of component carriers for which PUCCH switching is enabled. The apparatus may include means for selecting a second component carrier, of the plurality of component carriers for which PUCCH switching is enabled, that is to be used for transmitting a second PUCCH repetition of the plurality of PUCCH repetitions. The apparatus may include means for transmitting the second PUCCH repetition on the second component carrier.

Some aspects described herein relate to an apparatus for wireless communication. The apparatus may include means for determining whether uplink symbols on a primary component carrier, of a plurality of component carriers for which PUCCH switching is enabled, are sufficient to permit any PUCCH repetition, of a plurality of PUCCH repetitions, to be transmitted in a plurality of consecutive slots on the primary component carrier. The apparatus may include means for selecting a component carrier, of the plurality of component carriers, that is to be used for transmitting one or more PUCCH repetitions of the plurality of PUCCH repetitions based at least in part on the determination of whether uplink symbols on the primary component carrier are sufficient to permit any PUCCH repetition of the plurality of PUCCH repetitions to be transmitted in the plurality of consecutive slots. The apparatus may include means for transmitting the one or more PUCCH repetitions on the selected component carrier.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
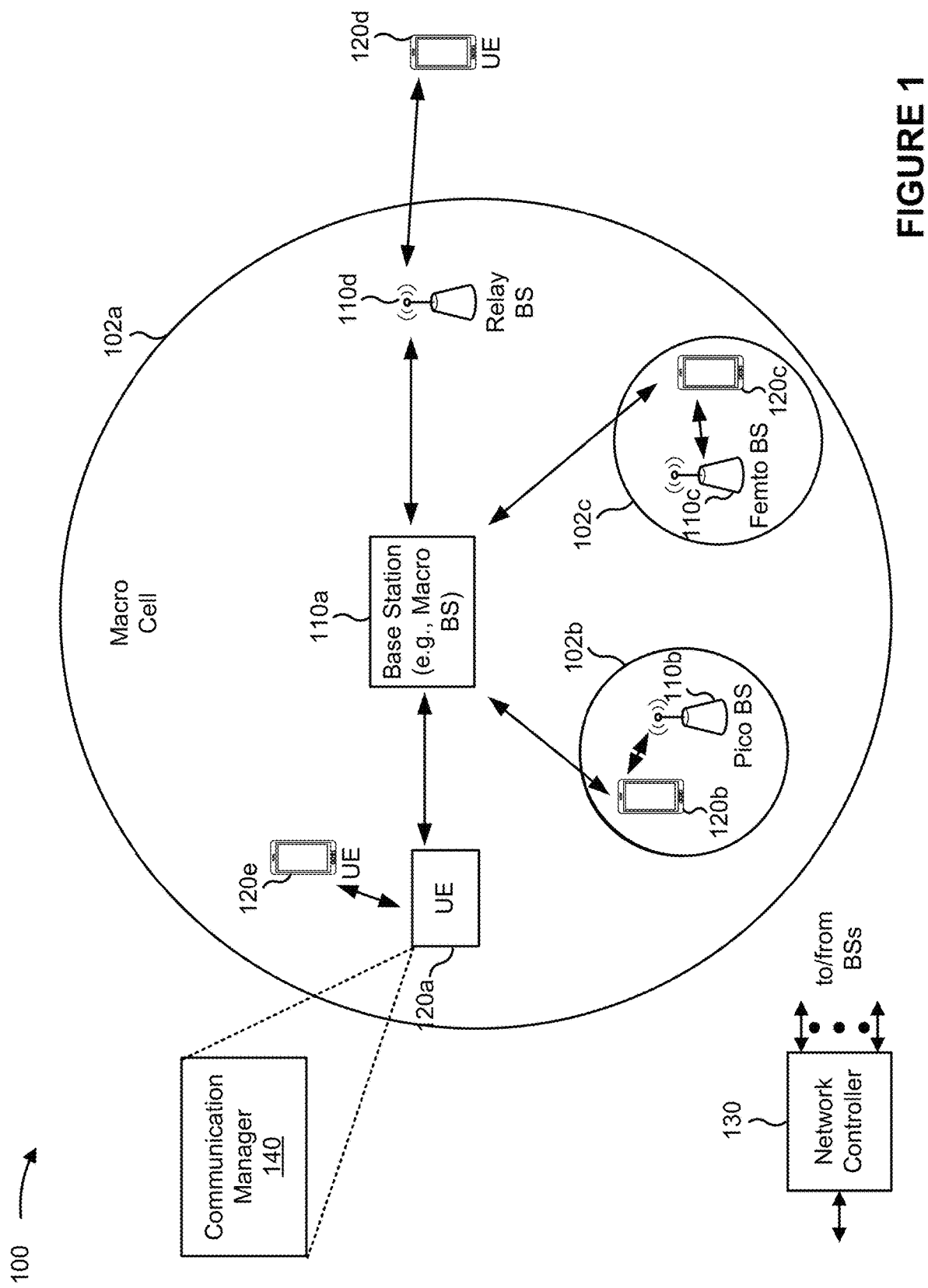
FIG. 1 is a diagram illustrating an example of a wireless network in accordance with the present disclosure.

Various aspects of the disclosure are described more fully hereinafter with reference to the accompanying drawings.

This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to physical uplink control channel (PUCCH) repetition across multiple component carriers of a PUCCH group (for example, a group of component carriers comprising a primary component carrier and one or more secondary component carriers). Some aspects more specifically relate to enabling a user equipment (UE) to switch among component carriers in the PUCCH group in association with transmitting PUCCH repetitions. That is, some aspects more specifically relate to configuring a UE to perform PUCCH switching in association with transmitting PUCCH repetitions. For example, in some aspects, the UE may transmit an initial PUCCH repetition on a first component carrier of a plurality of component carriers for which PUCCH switching is enabled. The UE may then select a second component carrier, of the plurality of component carriers for which PUCCH switching is enabled, to be used for transmitting a second PUCCH repetition of the plurality of PUCCH repetitions, and may transmit the second PUCCH repetition on the second component carrier. In some aspects, the UE selects the first component carrier as the second component carrier based at least in part on a configuration indicating that the second PUCCH repetition is to be transmitted on a same component carrier as the initial PUCCH repetition. Alternatively, in some aspects, the UE selects the second component carrier based at least in part on a timing pattern associated with performing PUCCH switching among the component carriers. As another example, in some aspects, the UE may determine whether uplink symbols on the primary component carrier are sufficient to permit any PUCCH repetition, of the plurality of PUCCH repetitions, to be transmitted in a group of consecutive slots on the primary component carrier, and may select a component carrier to be used for transmitting one or more PUCCH repetitions based at least in part on the determination. The UE may then transmit the one or more PUCCH repetitions on the selected component carrier, accordingly.

Particular aspects of the subject matter described in this disclosure can be implemented to realize one or more of the following potential advantages. In some examples, the described techniques can be used to enable PUCCH switching for PUCCH repetition, thereby reducing delay associated with transmitting a group of PUCCH repetitions. In some aspects, reduction of the PUCCH repetition delay enables a reliability or latency requirement for a given type of communication (for example, URLLC) to be satisfied.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110*d* (for example, a relay base station) may communicate with the BS 110*a* (for example, a macro base station) and the UE 120*d* in order to facilitate communication between the BS 110*a* and the UE 120*d*. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may transmit an initial PUCCH repetition on a first component carrier of a plurality of component carriers for which PUCCH switching is enabled; select a second component carrier, of the plurality of component carriers for which PUCCH switching is enabled, that is to be used for transmitting a second PUCCH repetition of the plurality of PUCCH repetitions; and transmit the second PUCCH repetition on the second component carrier. Additionally, or alternatively, the communication manager 140 may perform one or more other operations described herein.

In some aspects, the UE 120 may include a communication manager 140. As described in more detail elsewhere herein, the communication manager 140 may determine whether uplink symbols on a primary component carrier, of a plurality of component carriers for which PUCCH switching is enabled, are sufficient to permit any PUCCH repetition, of a plurality of PUCCH repetitions, to be transmitted in a plurality of consecutive slots on the primary component carrier; select a component carrier, of the plurality of component carriers, that is to be used for transmitting one or more PUCCH repetitions of the plurality of PUCCH repetitions based at least in part on the determination of whether uplink symbols on the primary component carrier are sufficient to permit any PUCCH repetition of the plurality of PUCCH repetitions to be transmitted in the plurality of consecutive slots; and transmit the one or more PUCCH repetitions on the selected component carrier. Additionally, or alternatively, the communication manager 140 may perform one or more other operations described herein.

Figure 2:
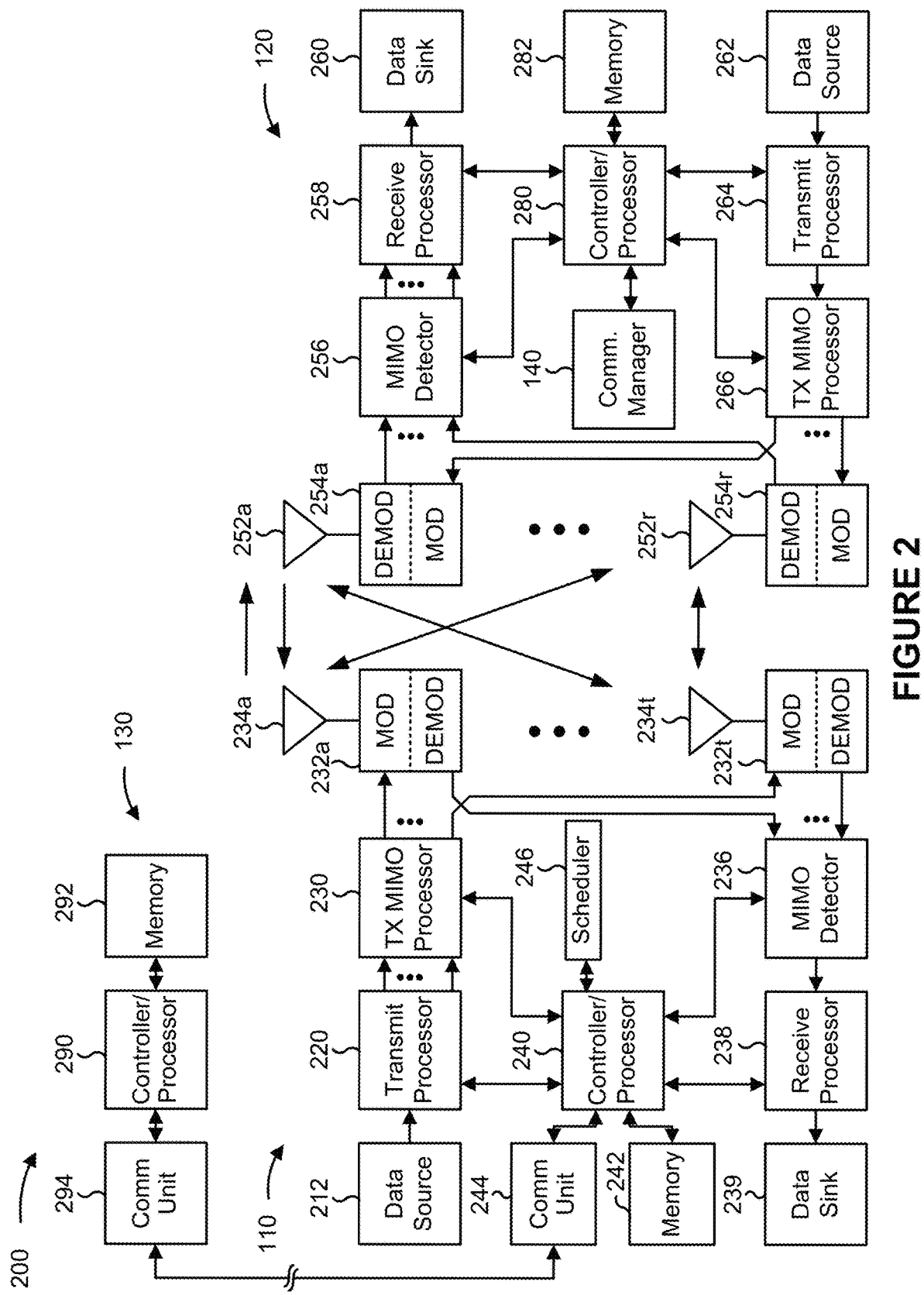
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with PUCCH repetition across multiple component carriers, as described in more detail elsewhere herein. For example, the controller/processor 240 of the base station 110, the controller/processor 280 of the UE 120, or any other component(s) of FIG. 2 may perform or direct operations of, for example, process 900 of FIG. 9, process 1000 of FIG. 10, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 900 of FIG. 9, process 1000 of FIG. 10, or other processes as described herein. In some examples, executing instructions may include running the instructions, converting the instructions, compiling the instructions, or interpreting the instructions, among other examples.

In some aspects, the UE includes means for transmitting an initial PUCCH repetition on a first component carrier of a plurality of component carriers for which PUCCH switching is enabled; means for selecting a second component carrier, of the plurality of component carriers for which PUCCH switching is enabled, that is to be used for transmitting a second PUCCH repetition of the plurality of PUCCH repetitions; and/or means for transmitting the second PUCCH repetition on the second component carrier. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a UE includes means for determining whether uplink symbols on a primary component carrier, of a plurality of component carriers for which PUCCH switching is enabled, are sufficient to permit any PUCCH repetition, of a plurality of PUCCH repetitions, to be transmitted in a plurality of consecutive slots on the primary component carrier; means for selecting a component carrier, of the plurality of component carriers, that is to be used for transmitting one or more PUCCH repetitions of the plurality of PUCCH repetitions based at least in part on the determination of whether uplink symbols on the primary component carrier are sufficient to permit any PUCCH repetition of the plurality of PUCCH repetitions to be transmitted in the plurality of consecutive slots; and/or means for transmitting the one or more PUCCH repetitions on the selected component carrier. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some wireless communication systems, a UE may switch among component carriers in a PUCCH group (for example, a PUCCH group comprising a primary component carrier and one or more secondary component carriers) in association with transmitting PUCCH transmissions. Generally, a base station indicates, to the UE, a component carrier on which the UE is to transmit a PUCCH transmission in a given slot. For example, downlink control information (DCI) provided by the base station may indicate a component carrier on which a PUCCH transmission (for example, an acknowledgement/negative acknowledgement (A/N)) associated with a dynamically scheduled physical downlink shared channel (PDSCH) transmission is to be transmitted. As another example, a radio resource control (RRC) configured timing pattern provided by the base station may indicate a component carrier on which a PUCCH transmission (for example, an A/N) for a semi-persistent scheduling (SPS) PDSCH transmission is to be transmitted. Here, the timing pattern may identify, for each slot, a component carrier of the PUCCH group to be used for transmitting PUCCH transmissions.

Additionally, a UE may be configured with PUCCH repetitions enabled for a given PUCCH format. Repetition of a PUCCH transmission is performed over multiple slots and improves reliability and coverage of the PUCCH. The base station enables PUCCH repetitions by including, in a PUCCH format configuration, an information element that indicates a number of slots in which the UE is to transmit a given PUCCH transmission. For example, if the information element carries a value of 4, then the UE transmits a PUCCH transmission that uses the format a total of four times—an initial transmission followed by three repetitions. Generally, each repetition of a PUCCH transmission occupies the same number of symbols as the initial transmission and uses the same starting symbol within each slot as the initial transmission (for example, as defined by a PUCCH resource configuration). The UE does not transmit a PUCCH repetition in a given slot if the UE determines the slot does not have sufficient uplink symbols available for the PUCCH transmission.

Conventionally, PUCCH repetition is permitted only on a primary component carrier of a PUCCH group configured for the UE. However, permitting PUCCH repetitions only on the primary component carrier can result in undesirable delay associated with transmitting PUCCH repetitions. For example, a PUCCH resource configuration for the primary component carrier may indicate that a given slot is a downlink slot (for example, a slot in which only downlink transmissions can be communicated) or a special slot including a set of downlink symbols, a set of guard symbols, and a set of uplink symbols, where the set of uplink symbols in the special slot is insufficient to carry a PUCCH repetition. In such examples, the UE has to wait to transmit a given PUCCH repetition until a slot on the primary component carrier has sufficient available uplink symbols. Such a delay is particularly undesirable for a type of communication with high-reliability or low-latency requirements, such as ultra-reliable low-latency communication (URLLC).

Various aspects relate generally to PUCCH repetition across multiple component carriers. Some aspects more specifically relate to enabling a UE to switch among component carriers in a PUCCH group in association with transmitting PUCCH repetitions. That is, some aspects more specifically relate to configuring a UE to perform PUCCH switching in association with transmitting PUCCH repetitions. For example, in some aspects, the UE may transmit an initial PUCCH repetition on a first component carrier of a plurality of component carriers for which PUCCH switching is enabled. The UE may then select a second component carrier, of the plurality of component carriers for which PUCCH switching is enabled, to be used for transmitting a second PUCCH repetition of the plurality of PUCCH repetitions, and may transmit the second PUCCH repetition on the second component carrier. In some aspects, the UE selects the first component carrier as the second component carrier based at least in part on a configuration indicating that the second PUCCH repetition is to be transmitted on a same component carrier as the initial PUCCH repetition. Alternatively, in some aspects, the UE selects the second component carrier based at least in part on a timing pattern associated with performing PUCCH switching among the component carriers. As another example, in some aspects, the UE may determine whether uplink symbols on the primary component carrier are sufficient to permit any PUCCH repetition, of the plurality of PUCCH repetitions, to be transmitted in a group of consecutive slots on the primary component carrier, and may select a component carrier to be used for transmitting one or more PUCCH repetitions based at least in part on the determination. The UE may then transmit the one or more PUCCH repetitions on the selected component carrier, accordingly.

Particular aspects of the subject matter described in this disclosure can be implemented to realize one or more of the following potential advantages. In some examples, the described techniques can be used to enable PUCCH switching for PUCCH repetition, thereby reducing delay associated with transmitting a group of PUCCH repetitions. In some aspects, reduction of the PUCCH repetition delay enables a reliability or latency requirement for a given type of communication (for example, URLLC) to be satisfied.

Figure 3:
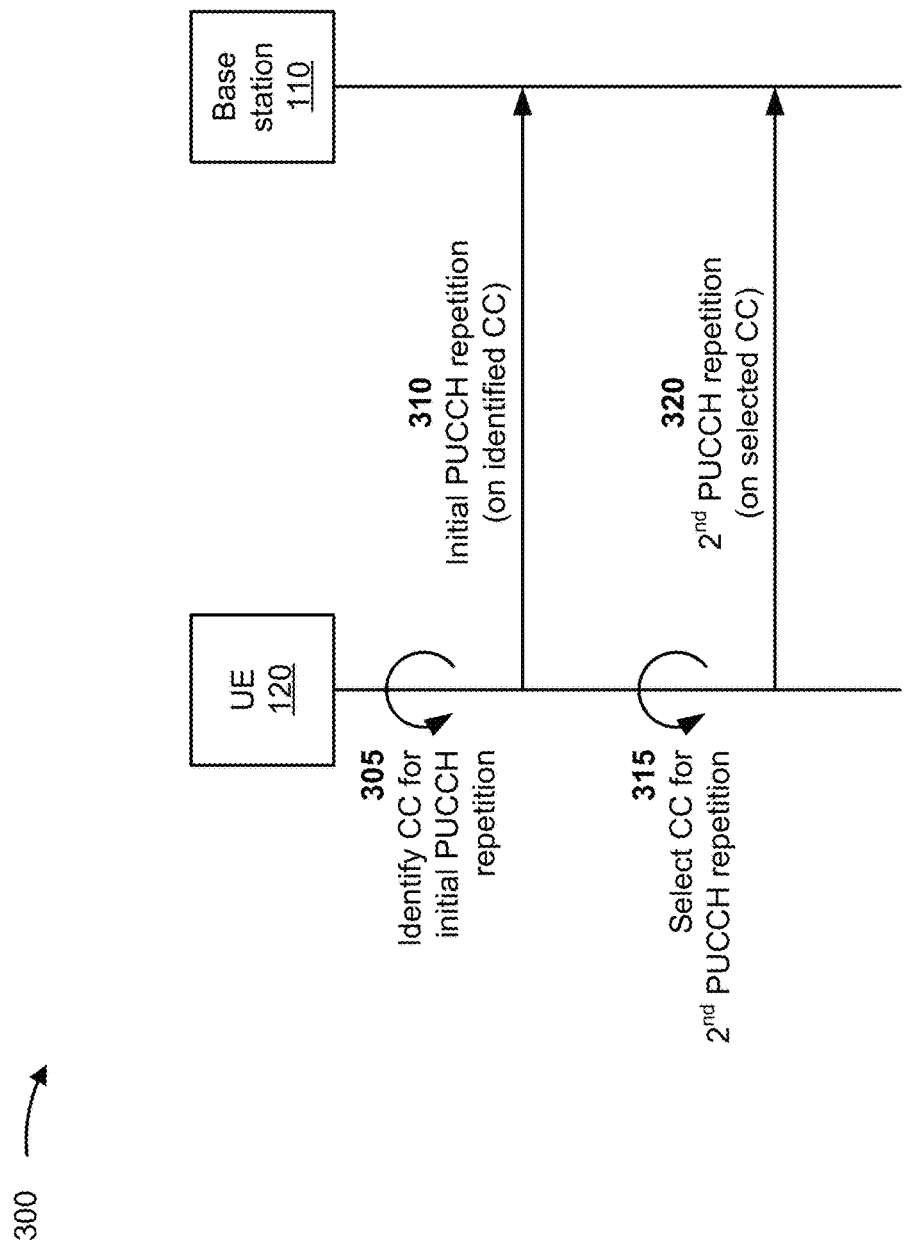
FIGS. 3-8 are diagrams illustrating examples associated with physical uplink control channel (PUCCH) repetition across multiple component carriers in accordance with the present disclosure.
Figure 4:
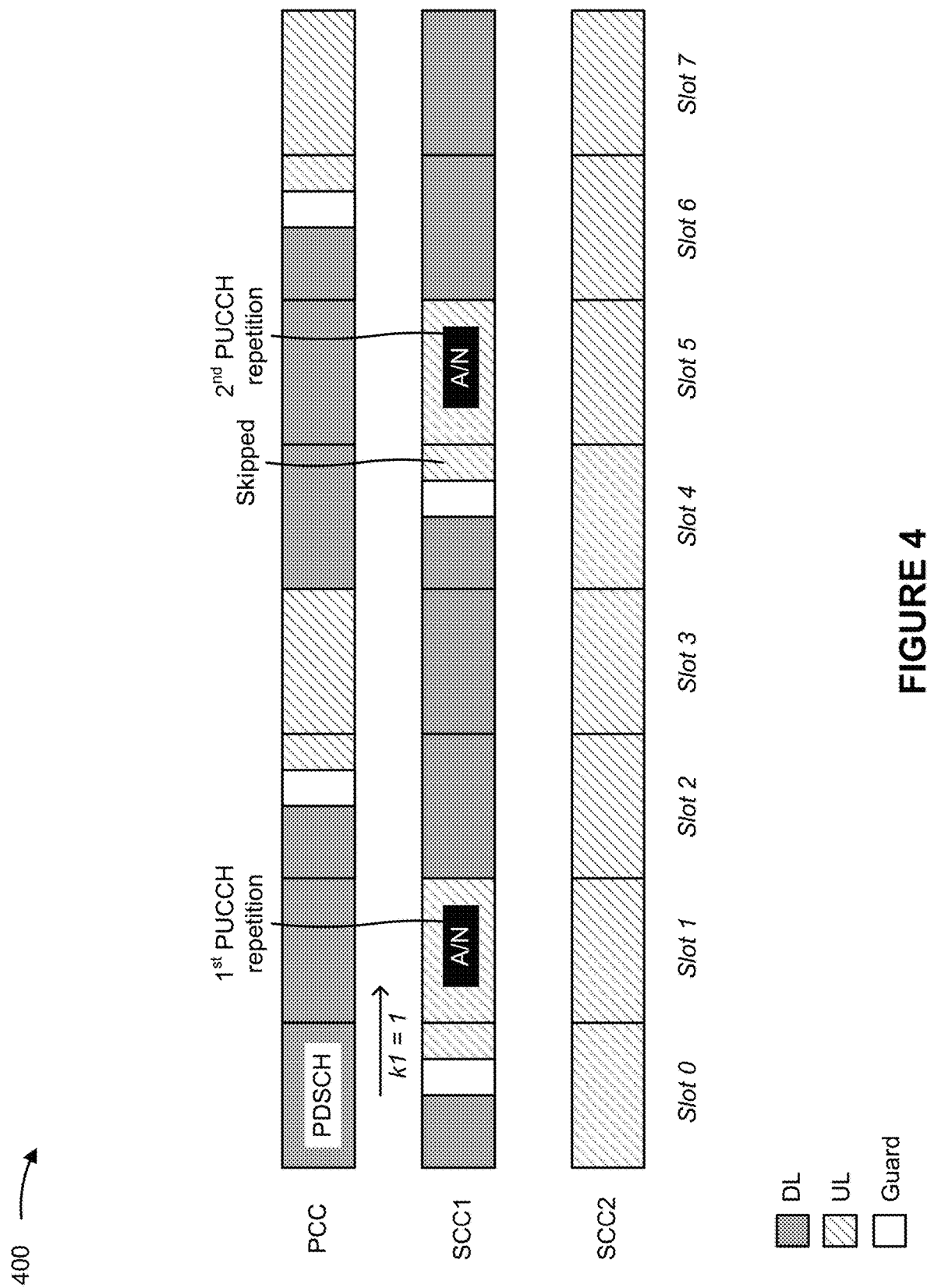
Figure 5:
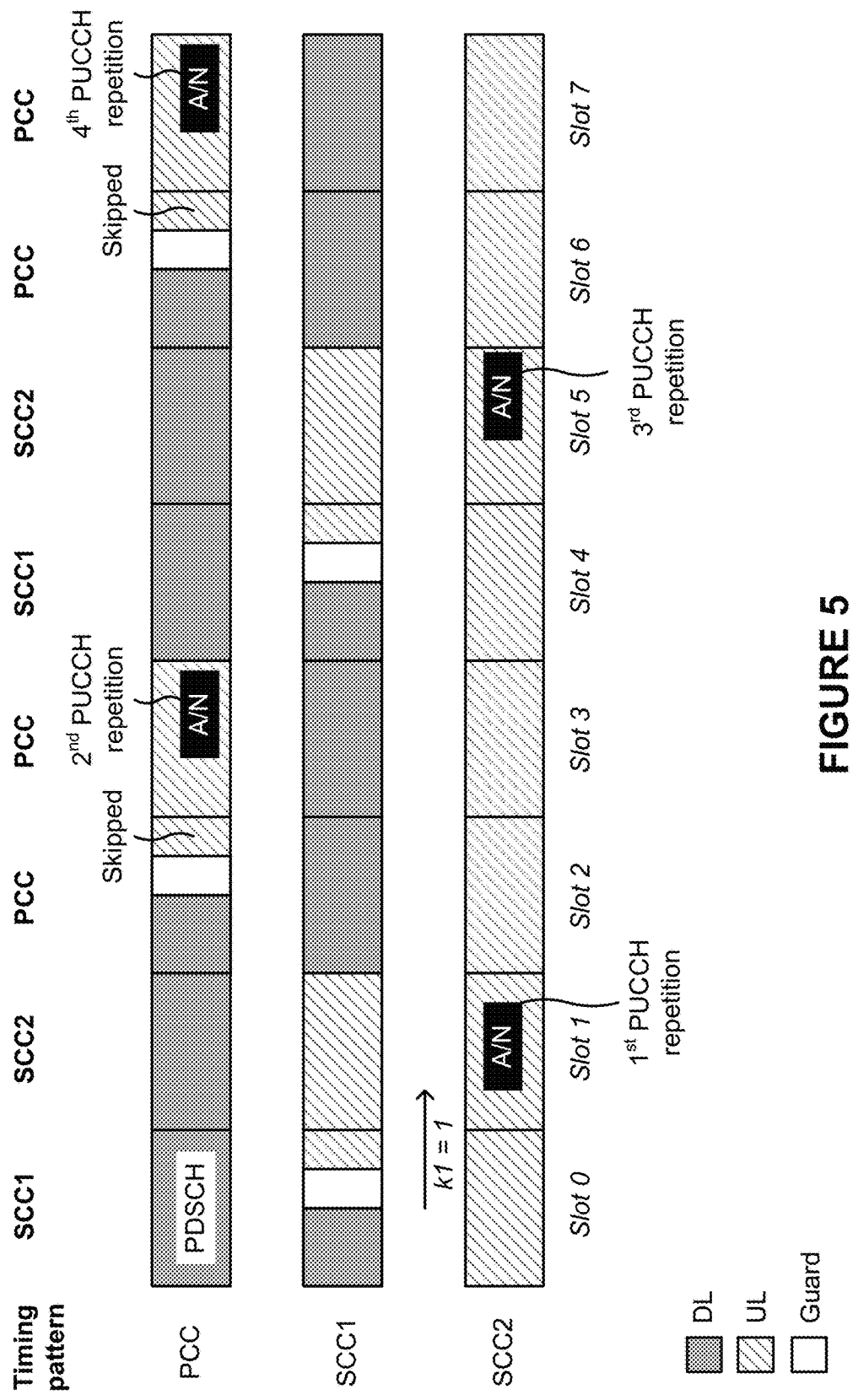

FIGS. 3-5 are diagrams illustrating examples associated with PUCCH repetition across multiple component carriers in accordance with the present disclosure. In FIG. 3, a UE 120 is in communication with a base station 110. In some aspects, the UE 120 and the base station 110 may be included in a wireless network, such as wireless network 100. The base station 110 and the UE 120 may communicate via a wireless access link, which may include an uplink and a downlink.

In example 300 of FIG. 3, the UE 120 has received an indication that the UE 120 is to transmit K (K>1) repetitions of a PUCCH transmission, and PUCCH switching is enabled for a plurality of component carriers (e.g., a PUCCH group) comprising a primary component carrier and one or more secondary component carriers.

As shown, in a first operation 305, the UE 120 identifies a first component carrier, of a plurality of component carriers (for example, a PUCCH group), that is to be used for transmitting an initial PUCCH repetition of the K PUCCH repetitions. In some aspects, the first component carrier may be the primary component carrier of the PUCCH group or may be a secondary component carrier of the PUCCH group.

In some aspects, the UE 120 may identify the first component carrier based at least in part on an indication provided by the base station 110. For example, the base station 110 may provide, and the UE 120 may receive, DCI indicating a component carrier on which the UE 120 is to transmit a PUCCH transmission (for example, an A/N) associated with a dynamically scheduled PDSCH transmission. Here, the UE 120 may identify the first component carrier as the component carrier indicated in the DCI. As another example, the base station 110 may provide, and the UE 120 may receive, an RRC configured timing pattern that indicates a component carrier on which a PUCCH transmission (for example, an A/N) for an SPS PDSCH transmission is to be transmitted. The timing pattern may identify, for each slot, a component carrier of the PUCCH group that can be used by the UE 120 for transmitting PUCCH transmissions. In this example, the UE 120 may identify the first component carrier based at least in part on the timing pattern and a k1 value, provided by the base station 110, that indicates an offset between the slot in which the SPS PDSCH is received and the slot in which A/N is to be transmitted.

In a second operation 310, the UE 120 transmits the initial PUCCH repetition on the first component carrier. For example, if the UE 120 identifies the primary component carrier as the first component carrier, then the UE 120 may transmit the initial PUCCH repetition on the primary component carrier (for example, in a next slot with sufficient available uplink symbols to carry the first PUCCH repetition).

In a third operation 315, the UE 120 selects a second component carrier that is to be used for transmitting a second PUCCH repetition. In some aspects, the second component carrier may be the primary component carrier of the PUCCH group or may be a secondary component carrier of the PUCCH group.

In some aspects, the UE 120 selects the first component carrier as the second component carrier based at least in part on a configuration indicating that the second PUCCH repetition is to be transmitted on a same component carrier as the initial PUCCH repetition. That is, in some aspects, the UE 120 may be configured to transmit PUCCH repetitions following the initial PUCCH repetition on the same component carrier as the first PUCCH repetition. For example, the UE 120 may identify the primary component carrier as the first component carrier, and may transmit the initial PUCCH repetition on the primary component carrier, accordingly. In this example, because the UE 120 transmitted the initial PUCCH repetition on the primary component carrier, the UE 120 may select the primary component carrier as the second component carrier. As another example, the UE 120 may identify a particular secondary component carrier as the first component carrier, and may transmit the initial PUCCH on the particular secondary component carrier, accordingly. In this example, because the UE 120 transmitted the initial PUCCH repetition on the particular secondary component carrier, the UE 120 may select the particular secondary component carrier as the second component carrier. An illustrative example of such selection is described below with respect to FIG. 4.

In some aspects, the UE 120 selects the second component carrier based at least in part on the timing pattern associated with performing PUCCH switching among the plurality of component carriers. That is, in some aspects, the UE 120 may be configured such that PUCCH repetitions following the initial PUCCH repetition can be transmitted on the same component carrier as the initial PUCCH repetition or on one or more different component carriers as the initial PUCCH repetition. Here, the component carrier for a given PUCCH repetition depends on the timing pattern (for example, configured through RRC signaling). Thus, in some aspects, the second component carrier may be the same component carrier as the first component carrier or may be a different component carrier than the first component carrier. An illustrative example of such selection is described below with respect to FIG. 5.

In some aspects, the UE 120 may select the second component carrier based at least in part on a time domain duplex (TDD) configuration associated with the second component carrier. For example, the UE 120 may determine, based at least in part on the timing pattern, that a particular component carrier is to be used for PUCCH transmissions in a given slot. The UE 120 may then determine, based at least in part on a TDD configuration associated with the particular component carrier, whether the given slot in the particular component carrier is a downlink slot, a special slot (for example, a slot including a set of downlink symbols, a set of guard symbols, and a set of uplink symbols), or an uplink slot (for example, a slot comprising only uplink symbols). If the given slot is an uplink slot or a special slot, then the UE 120 may determine, based at least in part on a PUCCH resource configuration associated with the PUCCH repetitions, whether the given slot has sufficient uplink symbols to carry the PUCCH repetition. Here, if the UE 120 determines that the given slot on the particular component carrier has sufficient uplink symbols to carry the PUCCH repetition, then the UE 120 selects the particular component carrier as the second component carrier. Conversely, if the given slot is a downlink slot or the UE 120 determines that the given slot on the particular component carrier does not have sufficient uplink symbols to carry the PUCCH repetition (for example, when the given slot is a special slot with insufficient uplink symbols to carry the PUCCH repetition), then the UE 120 may restart the selection process (for example, by identifying a component carrier to be used in the next slot as indicated by the timing pattern). The UE 120 may repeat this process until the UE 120 identifies a component carrier on which the second PUCCH repetition can be transmitted.

In some aspects, the UE 120 may repeat this selection process for each PUCCH repetition to be transmitted by the UE 120.

In some aspects, the UE 120 may select the second component carrier based at least in part on priorities associated with component carriers in the PUCCH group. For example, the UE 120 may in some aspects perform a priority-based selection of the component carrier after determining that, at a given slot, the component carrier indicated by the timing pattern cannot be used for transmitting the PUCCH configuration. Thus, in some aspects, the priority-base selection can be used in combination with the timing pattern. As another example, the UE 120 may in some aspects perform the priority-based selection (rather than using the timing pattern).

In a fourth operation 320, the UE 120 transmits the second PUCCH repetition on the second component carrier. For example, in some aspects, if the UE 120 selects the first component carrier as the second component carrier, then the UE 120 may transmit the second PUCCH repetition on the first component carrier in a (next) slot with sufficient available uplink symbols to carry the second PUCCH repetition. As another example, in some aspects, if the UE 120 selects the second component carrier based at least in part on the timing pattern, the TDD configuration, or the PUCCH resource configuration, then the UE 120 may transmit the second PUCCH repetition on the selected component carrier.

FIG. 4 is a diagram of an example 400 in which the UE 120 selects the first component carrier as the second component carrier based at least in part on a configuration indicating that the second PUCCH repetition is to be transmitted on a same component carrier as the initial PUCCH repetition. In example 400, the UE 120 is to transmit four PUCCH repetitions. As shown in FIG. 4, the UE 120 receives a PDSCH transmission on the primary component carrier (PCC) in slot 0. As shown, the PDSCH may indicate a k1 value of 1, meaning that an offset from the PDSCH to the initial PUCCH repetition is one slot. Further, in example 400, the base station 110 indicates (for example, via DCI or via a timing pattern) that the initial PUCCH repetition is to be transmitted on a first secondary component carrier (SCC1). Thus, in example 400, the UE 120 identifies SCC1 as the first component carrier and, as shown, transmits the initial PUCCH repetition (A/N) on SCC1 in slot 1 (since slot 1 has sufficient uplink symbols to carry the PUCCH repetition). Here, the UE 120 selects SCC1 as the second component carrier based at least in part on a configuration indicating that the second PUCCH repetition is to be transmitted on a same component carrier as the initial PUCCH repetition. Thus, the UE 120 is to transmit the second PUCCH repetition on SCC1. In example 400, slot 2 and slot 3 on SCC1 are downlink slots and a slot 4 is a special slot with insufficient uplink resources to carry the second PUCCH repetition. Thus, as shown, the UE 120 transmits the second PUCCH repetition in slot 5. A third PUCCH and a fourth PUCCH repetition can be transmitted on SCC1 in a similar manner.

FIG. 5 is a diagram of an example 500 in which the UE 120 selects the second component carrier based at least in part on a timing pattern associated with performing PUCCH switching among the PUCCH group. In example 500, the UE 120 is to transmit four PUCCH repetitions. As shown in FIG. 5, the UE 120 receives a PDSCH transmission on the primary component carrier (PCC) in slot 0. As shown, the PDSCH may indicate a k1 value of 1, meaning that an offset from the PDSCH to the initial PUCCH repetition is one slot.

Further, in example 500, the base station 110 indicates (for example, via DCI or via the timing pattern) that the initial PUCCH repetition is to be transmitted on a second secondary component carrier (SCC2). Thus, in example 500, the UE 120 identifies SCC2 as the first component carrier and, as shown, transmits the initial PUCCH repetition (A/N) on SCC2 in slot 1 (since slot 1 has sufficient uplink symbols to carry the PUCCH repetition).

For transmission of the second PUCCH repetition, the UE 120 determines that the timing pattern indicates that PCC is to be used for PUCCH communications in slot 3. However, in example 500, slot 3 on PCC is a special slot with insufficient uplink symbols to carry the second PUCCH repetition and, therefore, the UE 120 does not transmit the second PUCCH repetition in slot 3. Next, the UE 120 determines that the timing pattern indicates that PCC is to be used for PUCCH communications in slot 4. Here, slot 4 on PCC is an uplink slot with sufficient uplink symbols to carry the second PUCCH repetition and, therefore, the UE 120 selects PCC as the second component carrier and transmits the second PUCCH transmission on PCC in slot 3.

For transmission of the third PUCCH repetition, the UE 120 determines that the timing pattern indicates that a first secondary component carrier (SSC1) is to be used for PUCCH communications in slot 4. However, in example 500, slot 4 on SCC1 is a special slot with insufficient uplink symbols to carry the second PUCCH repetition and, therefore, the UE 120 does not transmit the second PUCCH repetition in slot 4. Next, the UE 120 determines that the timing pattern indicates that SCC2 is to be used for PUCCH communications in slot 5. Here, slot 5 on SCC2 is an uplink slot with sufficient uplink symbols to carry the second PUCCH repetition and, therefore, the UE 120 selects SCC2 as the component carrier for the third PUCCH repetition and transmits the third PUCCH transmission on SCC2 in slot 3.

For transmission of the fourth PUCCH repetition, the UE 120 determines that the timing pattern indicates that PCC is to be used for PUCCH communications in slot 6. However, in example 500, slot 6 on PCC is a special slot with insufficient uplink symbols to carry the fourth PUCCH repetition and, therefore, the UE 120 does not transmit the fourth PUCCH repetition in slot 6. Next, the UE 120 determines that the timing pattern indicates that PCC is to be used for PUCCH communications in slot 6. Here, slot 7 on PCC is an uplink slot with sufficient uplink symbols to carry the fourth PUCCH repetition and, therefore, the UE 120 selects PCC as the component carrier and transmits the fourth PUCCH transmission on PCC in slot 7.

Figure 6:
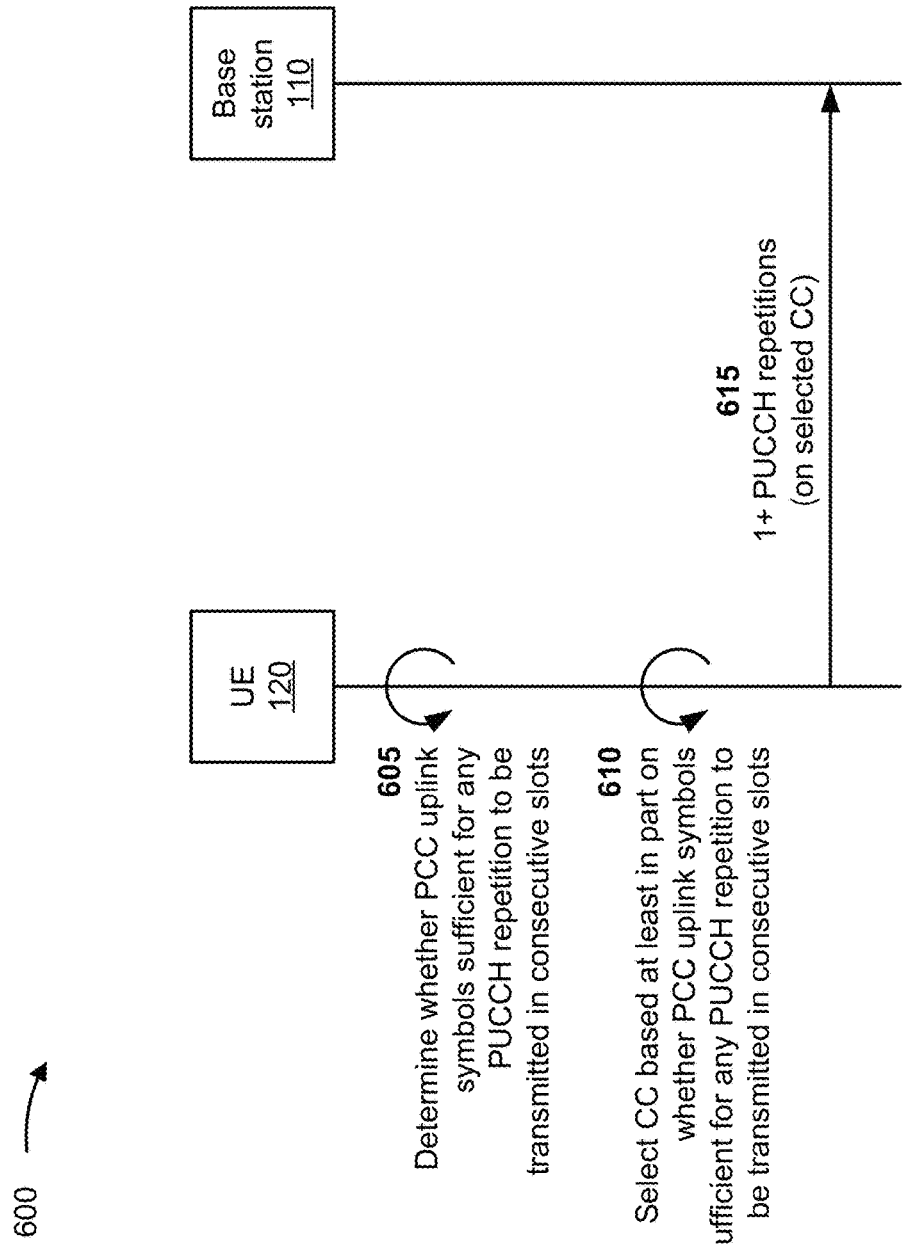
Figure 7:
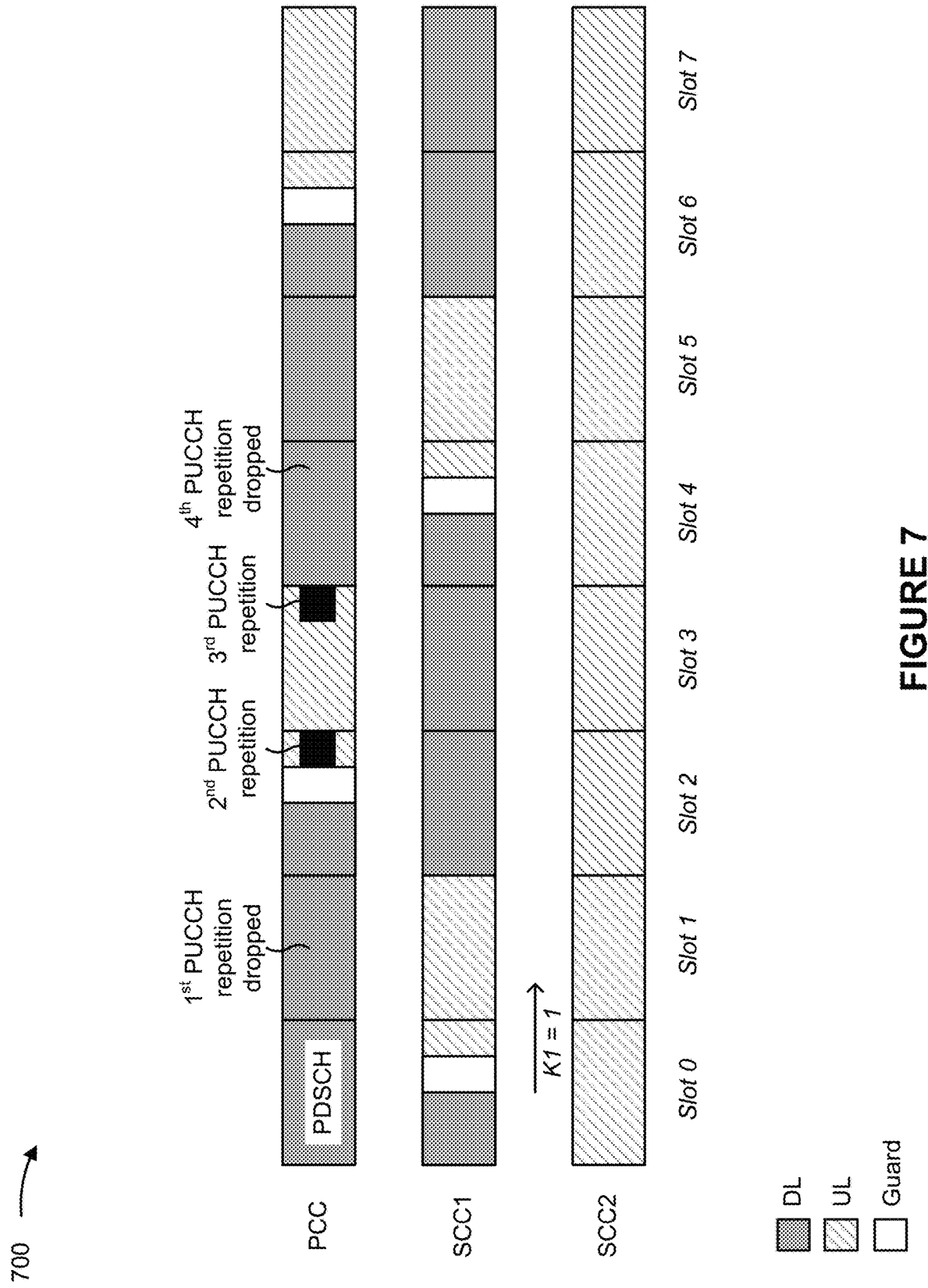
Figure 8:
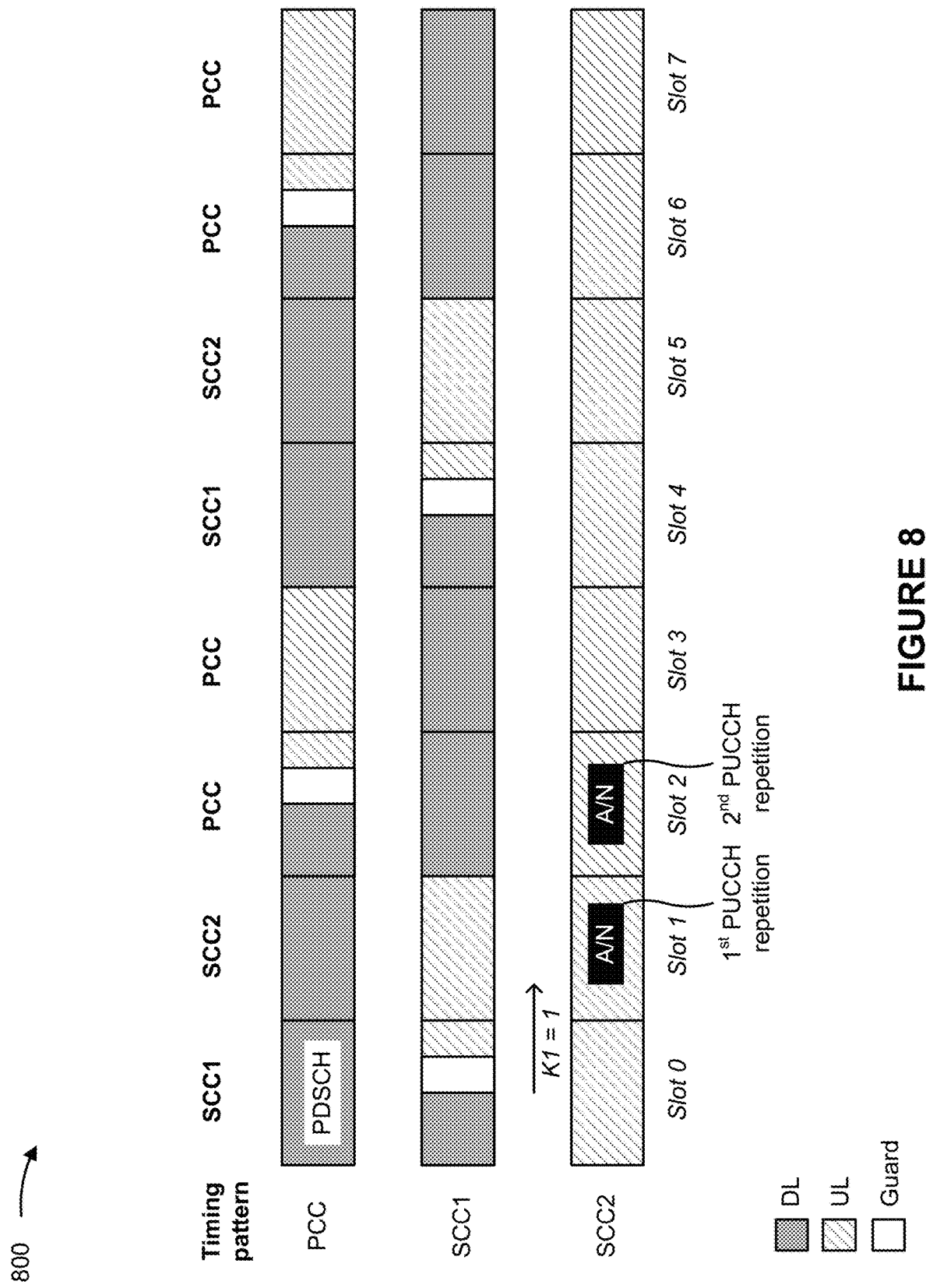

FIGS. 6-8 are diagrams illustrating examples associated with PUCCH repetition across multiple component carriers in accordance with the present disclosure. In FIGS. 6-8, a UE 120 is in communication with a base station 110. In some aspects, the UE 120 and the base station 110 may be included in a wireless network, such as wireless network 100. The base station 110 and the UE 120 may communicate via a wireless access link, which may include an uplink and a downlink.

In example 600 of FIG. 6, the UE 120 has received an indication that the UE 120 is to transmit K (K>1) repetitions of a PUCCH transmission, and PUCCH switching is enabled for a plurality of component carriers (e.g., a PUCCH group) comprising a primary component carrier and one or more secondary component carriers.

In a first operation 605, the UE 120 determines whether uplink symbols on the primary component carrier are sufficient to permit any PUCCH repetition, of the K PUCCH repetitions, to be transmitted in a group of consecutive slots on the primary component carrier (for example, a group of continuous physical slots starting with a slot of an initial PUCCH repetition). For example, the UE 120 may determine, based at least in part on a TDD configuration of the primary, whether uplink symbols on the primary component carrier are sufficient to permit any of the K PUCCH repetitions to be transmitted in a group of consecutive slots on the primary component carrier that includes the slot in which the initial PUCCH repetition is to be transmitted and the following K−1 consecutive slots.

In a second operation 610, the UE 120 selects a component carrier that is to be used for transmitting one or more PUCCH repetitions. In some aspects, the UE 120 selects the component carrier based at least in part on the determination of whether uplink symbols on the primary component carrier are sufficient to permit any PUCCH repetition to be transmitted in the group of consecutive slots on the primary component carrier.

In some aspects, the UE 120 selects the primary component carrier as the component carrier based at least in part on a determination that at least one PUCCH repetition, of the K PUCCH repetitions, can be transmitted in the group of consecutive slots on the primary component carrier. That is, when the UE 120 determines the that at least one PUCCH repetition does not have a conflict with respect to the TDD configuration of the primary component carrier, then the UE 120 may select the primary component carrier as the component carrier on which one or more PUCCH repetitions are to be transmitted.

In some aspects, the UE 120 selects a secondary component carrier as the component carrier based at least in part on a determination that no PUCCH repetitions can be transmitted in the group of consecutive slots on the primary component carrier. That is, when the UE 120 determines that all PUCCH repetitions have a conflict with respect to the TDD configuration of the primary component carrier, then the UE 120 may select a secondary component carrier as the component carrier. In some aspects, the UE 120 selects the secondary component carrier based at least in part on at least one of the timing pattern associated with performing PUCCH switching among the component carriers of the PUCCH group (for example, in a manner similar to that described above with respect to FIG. 3). In some aspects, the UE 120 selects the secondary component carrier based at least in part on priorities associated with secondary component carriers in the plurality of component carriers (for example, in a manner similar to that described above with respect to FIG. 3). In some aspects, the selected component carrier is to be used by the UE 120 used for transmitting each of one or more PUCCH repetitions.

In a third operation 615, the UE 120 transmits one or more PUCCH repetitions on the selected component carrier. For example, in some aspects, if the UE 120 selects the primary component carrier as the component carrier, then the UE 120 may transmit the one or more PUCCH repetitions on the primary component carrier in one or more slots with sufficient available uplink symbols to carry the PUCCH repetitions. As another example, in some aspects, if the UE 120 selects a particular secondary component carrier as the component carrier, then the UE 120 may transmit the one or more PUCCH repetitions on the particular secondary component carrier in one or more slots with sufficient available uplink symbols to carry the PUCCH repetitions.

In some aspects, the UE 120 may refrain from transmitting a PUCCH repetition based at least in part on a TDD configuration associated with the selected component carrier. For example, if the TDD configuration of the selected component carrier indicates that a particular slot is a downlink slot or is a special slot with insufficient uplink symbols to carry the PUCCH, then the UE 120 may refrain from transmitting the PUCCH repetition in that slot. That is, in some aspects, the UE 120 may drop one or more PUCCH repetitions based at least in part on the TDD configuration associated with the selected component carrier and the PUCCH resource configuration associated with the PUCCH repetitions.

FIG. 7 is a diagram of an example 700 in which the UE 120 selects the primary component carrier as the component carrier based at least in part on a determination that uplink symbols on the primary component carrier are sufficient to permit at least one PUCCH repetition to be transmitted in a group of consecutive slots on the primary component carrier. In example 700, the UE 120 is to transmit four PUCCH repetitions. As shown in FIG. 7, the UE 120 receives a PDSCH transmission on the primary component carrier (PCC) in slot 0. As shown, the PDSCH may indicate a k1 value of 1, meaning that an offset from the PDSCH to the initial PUCCH repetition is one slot. In example 700, the UE 120 determines, based at least in part on the TDD configuration of PCC and the PUCCH resource configuration associated with the PUCCH repetitions, that at least one PUCCH repetition can be transmitted in a group of consecutive slots on the primary component carrier (for example, a group of four consecutive slots starting at slot 1). For example, the UE 120 determines that the second PUCCH repetition and the third PUCCH repetition can be transmitted on the primary component carrier in the group of consecutive slots. Thus, in example 700, the UE 120 selects PCC as the component carrier and, as shown, transmits the second PUCCH repetition on PCC in slot 2 and the third PUCCH repetition on PCC in slot 3 (since slots 2 and 3 have sufficient uplink symbols to carry the PUCCH repetition). Notably, the UE 120 refrains from transmitting the first PUCCH repetition in slot 1 and the fourth PUCCH repetition in slot 4 since slots 1 and 4 are downlink slots and, therefore, have insufficient uplink symbols to carry PUCCH repetitions.

FIG. 8 is a diagram of an example 800 in which the UE 120 selects a secondary component carrier as the component carrier based at least in part on a determination that uplink symbols on a primary component carrier are insufficient to permit any PUCCH repetition to be transmitted in a group of consecutive slots on the primary component carrier. In example 800, the UE 120 is to transmit two PUCCH repetitions. As shown in FIG. 7, the UE 120 receives a PDSCH transmission on the primary component carrier (PCC) in slot 0. As shown, the PDSCH may indicate a k1 value of 1, meaning that an offset from the PDSCH to the initial PUCCH repetition is one slot. In example 800, the UE 120 determines, based at least in part on the TDD configuration of PCC and the PUCCH resource configuration associated with the PUCCH repetitions, no PUCCH repetitions can be transmitted in a group of consecutive slots on the primary component carrier (for example, a group of two consecutive slots starting at slot 1). For example, the UE 120 determines that neither the initial PUCCH repetition or the second PUCCH repetition can be transmitted on the primary component carrier in the group of consecutive slots starting at slot 1. Thus, in example 800, the UE 120 selects a secondary component carrier as the component carrier. In this example, the UE 120 selects a second secondary component carrier (SCC2) as the component carrier based at least in part on the timing pattern associated with performing PUCCH switching and, as shown, transmits the initial PUCCH repetition on SCC2 in slot 1 and the second PUCCH repetition on SCC2 in slot 2 (since slots 1 and 2 have sufficient uplink symbols to carry the PUCCH repetition).

Figure 9:
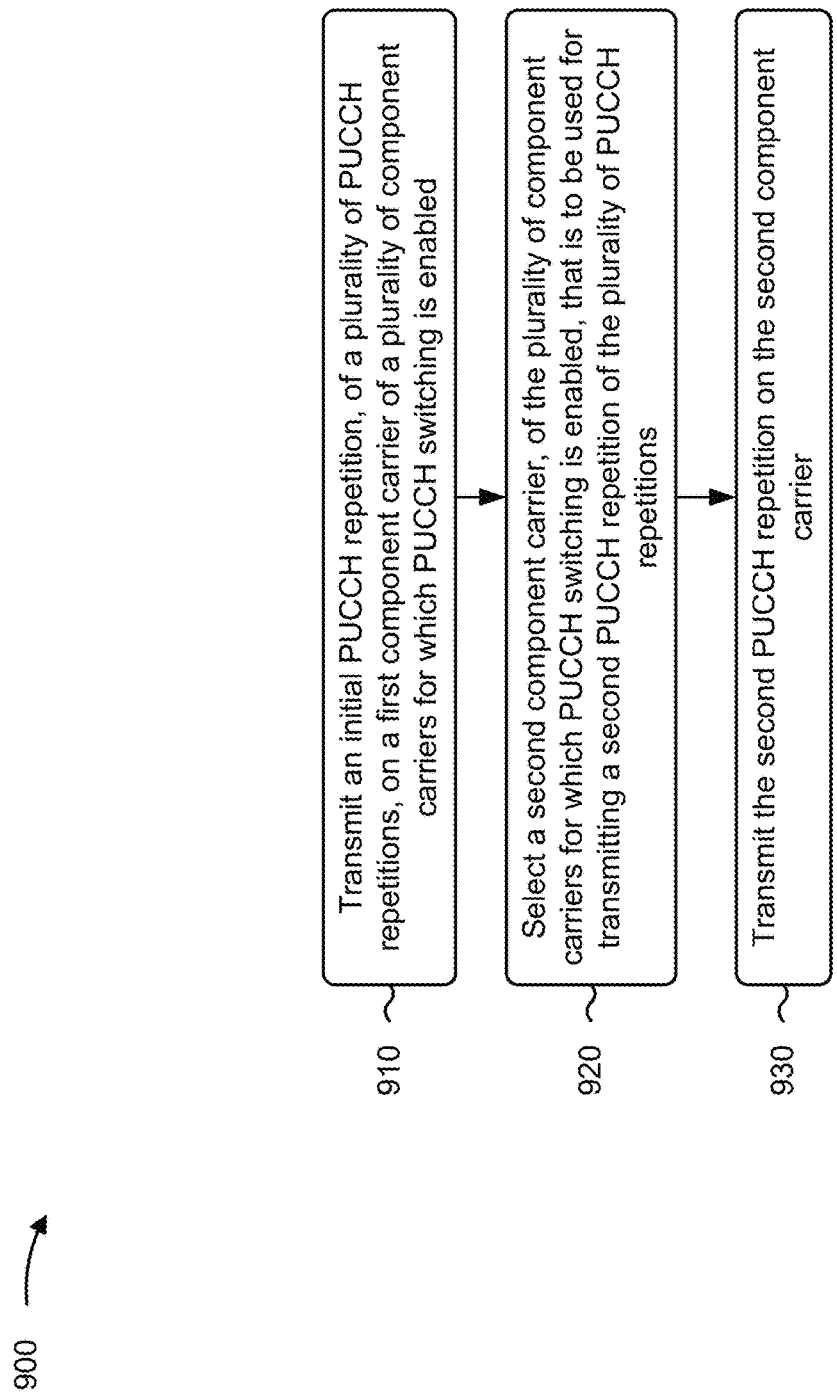
FIGS. 9 and 10 are flowcharts illustrating example processes performed, for example, by a UE in association with PUCCH repetition across multiple component carriers, in accordance with the present disclosure.

FIG. 9 is a flowchart illustrating an example process 900 performed, for example, by a UE in accordance with the present disclosure. Example process 900 is an example where the UE (for example, UE 120) performs operations associated with PUCCH repetition across multiple component carriers.

As shown in FIG. 9, in some aspects, process 900 may include transmitting an initial PUCCH repetition, of a plurality of PUCCH repetitions, on a first component carrier of a plurality of component carriers for which PUCCH switching is enabled (block 910). For example, the UE (such as by using communication manager 140 or transmission component 1104, depicted in FIG. 1) may transmit an initial PUCCH repetition, of a plurality of PUCCH repetitions, on a first component carrier of a plurality of component carriers for which PUCCH switching is enabled, as described above.

As further shown in FIG. 9, in some aspects, process 900 may include selecting a second component carrier, of the plurality of component carriers for which PUCCH switching is enabled, that is to be used for transmitting a second PUCCH repetition of the plurality of PUCCH repetitions (block 920). For example, the UE (such as by using communication manager 140 or selection component 1108, depicted in FIG. 11) may select a second component carrier, of the plurality of component carriers for which PUCCH switching is enabled, that is to be used for transmitting a second PUCCH repetition of the plurality of PUCCH repetitions, as described above.

As further shown in FIG. 9, in some aspects, process 900 may include transmitting the second PUCCH repetition on the second component carrier (block 930). For example, the UE (such as by using communication manager 140 or transmission component 1104, depicted in FIG. 11) may transmit the second PUCCH repetition on the second component carrier, as described above.

Process 900 may include additional aspects, such as any single aspect or any combination of aspects described below or in connection with one or more other processes described elsewhere herein.

In a first additional aspect, selecting the second component carrier comprises selecting the first component carrier as the second component carrier based at least in part on a configuration indicating that the second PUCCH repetition is to be transmitted on a same component carrier as the initial PUCCH repetition.

In a second additional aspect, alone or in combination with the first aspect, selecting the second component carrier comprises selecting the second component carrier based at least in part on a timing pattern associated with performing PUCCH switching among the plurality of component carriers.

In a third additional aspect, alone or in combination with one or more of the first and second aspects, the first component carrier is identified based at least in part on the timing pattern.

In a fourth additional aspect, alone or in combination with one or more of the first through third aspects, selecting the second component carrier comprises selecting the second component carrier based at least in part on priorities associated with component carriers in the plurality of component carriers.

In a fifth additional aspect, alone or in combination with one or more of the first through fourth aspects, selecting the second component carrier comprises selecting the second component carrier based at least in part on a time domain duplex (TDD) configuration associated with the second component carrier.

In a sixth additional aspect, alone or in combination with one or more of the first through fifth aspects, selecting the second component carrier comprises selecting the second component carrier based at least in part on a PUCCH resource configuration associated with the plurality of PUCCH repetitions.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
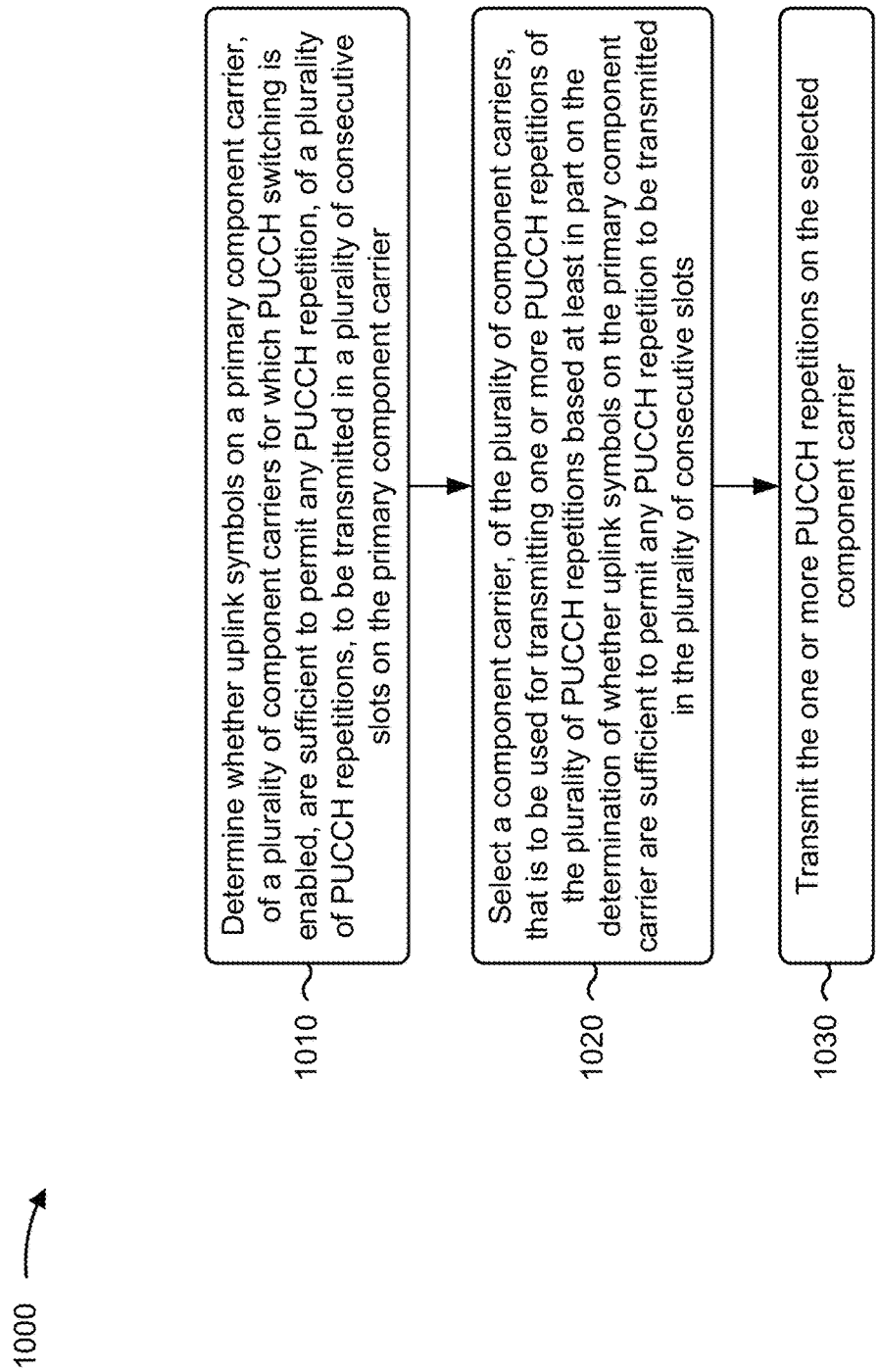

FIG. 10 is a flowchart illustrating an example process 1000 performed, for example, by a UE in accordance with the present disclosure. Example process 1000 is an example where the UE (for example, UE 120) performs operations associated with physical uplink control channel repetition across multiple component carriers.

As shown in FIG. 10, in some aspects, process 1000 may include determining whether uplink symbols on a primary component carrier, of a plurality of component carriers for which PUCCH switching is enabled, are sufficient to permit any PUCCH repetition, of a plurality of PUCCH repetitions, to be transmitted in a plurality of consecutive slots on the primary component carrier (block 1010). For example, the UE (such as by using communication manager 140 or determination component 1208, depicted in FIG. 12) may determine whether uplink symbols on a primary component carrier, of a plurality of component carriers for which PUCCH switching is enabled, are sufficient to permit any PUCCH repetition, of a plurality of PUCCH repetitions, to be transmitted in a plurality of consecutive slots on the primary component carrier, as described above.

As further shown in FIG. 10, in some aspects, process 1000 may include selecting a component carrier, of the plurality of component carriers, that is to be used for transmitting one or more PUCCH repetitions of the plurality of PUCCH repetitions based at least in part on whether uplink symbols on the primary component carrier are sufficient to permit any PUCCH repetition to be transmitted in the plurality of consecutive slots (block 1020). For example, the UE (such as by using communication manager 140 or selection component 1210, depicted in FIG. 12) may select a component carrier, of the plurality of component carriers, that is to be used for transmitting one or more PUCCH repetitions of the plurality of PUCCH repetitions based at least in part on whether uplink symbols on the primary component carrier are sufficient to permit any PUCCH repetition to be transmitted in the plurality of consecutive slots, as described above.

As further shown in FIG. 10, in some aspects, process 1000 may include transmitting the one or more PUCCH repetitions on the selected component carrier (block 1030). For example, the UE (such as by using communication manager 140 or transmission component 1204, depicted in FIG. 12) may transmit the one or more PUCCH repetitions on the selected component carrier, as described above.

Process 1000 may include additional aspects, such as any single aspect or any combination of aspects described below or in connection with one or more other processes described elsewhere herein.

In a first additional aspect, the primary component carrier is selected as the component carrier based at least in part on a determination that at least one PUCCH repetition can be transmitted in the plurality of consecutive slots on the primary component carrier.

In a second additional aspect, alone or in combination with the first aspect, a secondary component carrier of the plurality of component carriers is selected as the component carrier based at least in part on a determination that no PUCCH repetitions can be transmitted in the plurality of consecutive slots on the primary component carrier.

In a third additional aspect, alone or in combination with one or more of the first and second aspects, process 1000 includes selecting the secondary component carrier based at least in part on at least one of a timing pattern associated with performing PUCCH switching among the plurality of component carriers, or priorities associated with secondary component carriers in the plurality of component carriers.

In a fourth additional aspect, alone or in combination with one or more of the first through third aspects, process 1000 includes refraining from transmitting a PUCCH repetition, of the plurality of PUCCH repetitions, based at least in part on a TDD configuration associated with the selected component carrier.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
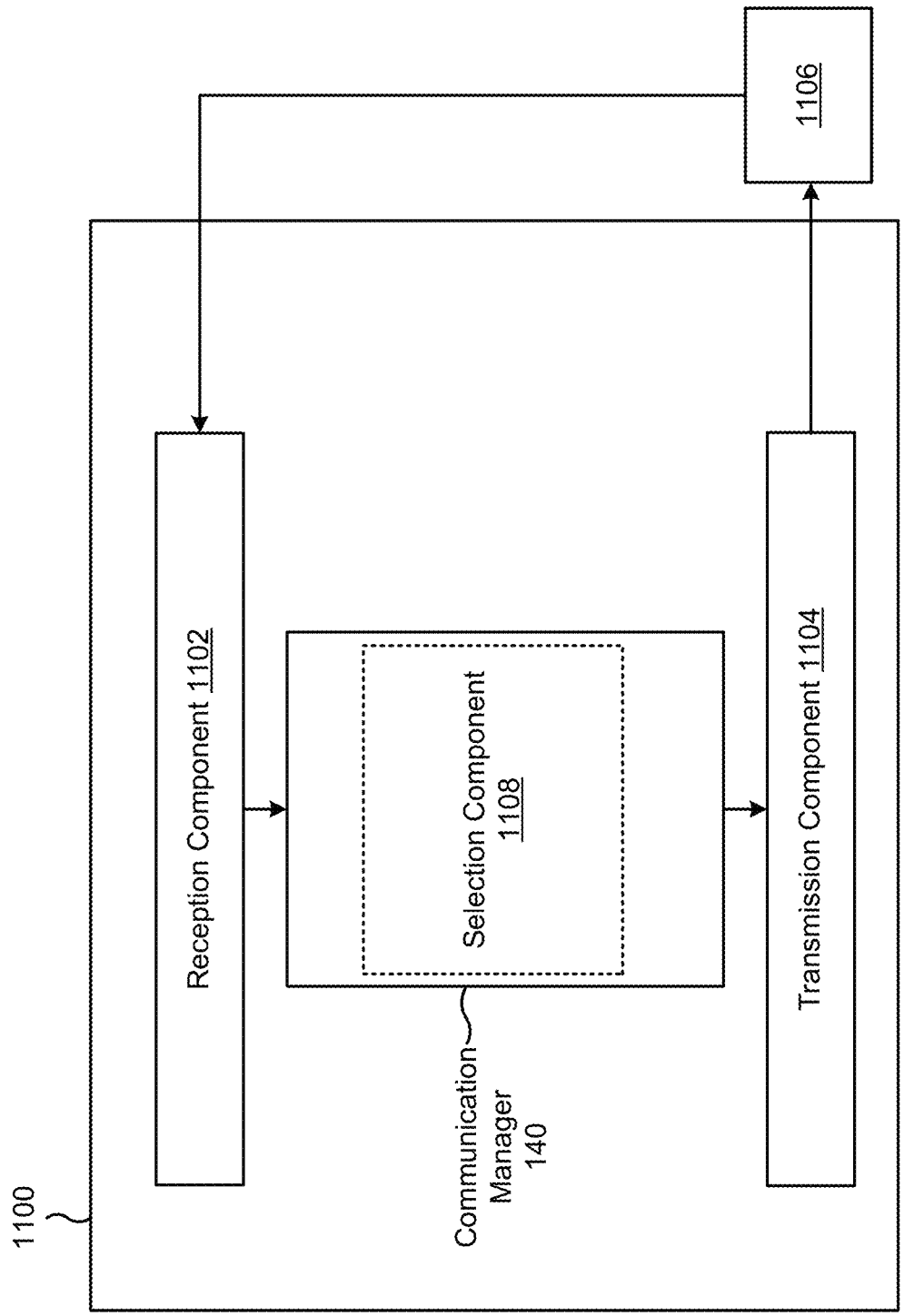
FIGS. 11 and 12 are diagrams of example apparatuses for wireless communication in association with PUCCH repetition across multiple component carriers in accordance with the present disclosure.

FIG. 11 is a diagram of an example apparatus 1100 for wireless communication in accordance with the present disclosure. The apparatus 1100 may be a UE, or a UE may include the apparatus 1100. In some aspects, the apparatus 1100 includes a reception component 1102, a transmission component 1104, and a communication manager 140, which may be in communication with one another (for example, via one or more buses). As shown, the apparatus 1100 may communicate with another apparatus 1106 (such as a UE, a base station, or another wireless communication device) using the reception component 1102 and the transmission component 1104.

In some aspects, the apparatus 1100 may be configured to perform one or more operations described herein in connection with FIGS. 3-5. Additionally or alternatively, the apparatus 1100 may be configured to perform one or more processes described herein, such as process 900 of FIG. 9. In some aspects, the apparatus 1100 may include one or more components of the UE described above in connection with FIG. 2.

The reception component 1102 may receive communications, such as reference signals, control information, data communications, or a combination thereof, from the apparatus 1106. The reception component 1102 may provide received communications to one or more other components of the apparatus 1100, such as the communication manager 140. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a modem, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, the communication manager 140 may generate communications and may transmit the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The communication manager 140 may transmit or may cause the transmission component 1104 to transmit an initial PUCCH repetition, of a plurality of PUCCH repetitions, on a first component carrier of a plurality of component carriers for which PUCCH switching is enabled. The communication manager 140 may select a second component carrier, of the plurality of component carriers for which PUCCH switching is enabled, that is to be used for transmitting a second PUCCH repetition of the plurality of PUCCH repetitions. The communication manager 140 may transmit or may cause the transmission component 1104 to transmit the second PUCCH repetition on the second component carrier. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a selection component 1108. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1104 may transmit an initial PUCCH repetition, of a plurality of PUCCH repetitions, on a first component carrier of a plurality of component carriers for which PUCCH switching is enabled. The selection component 1108 may select a second component carrier, of the plurality of component carriers for which PUCCH switching is enabled, that is to be used for transmitting a second PUCCH repetition of the plurality of PUCCH repetitions. The transmission component 1104 may transmit the second PUCCH repetition on the second component carrier.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
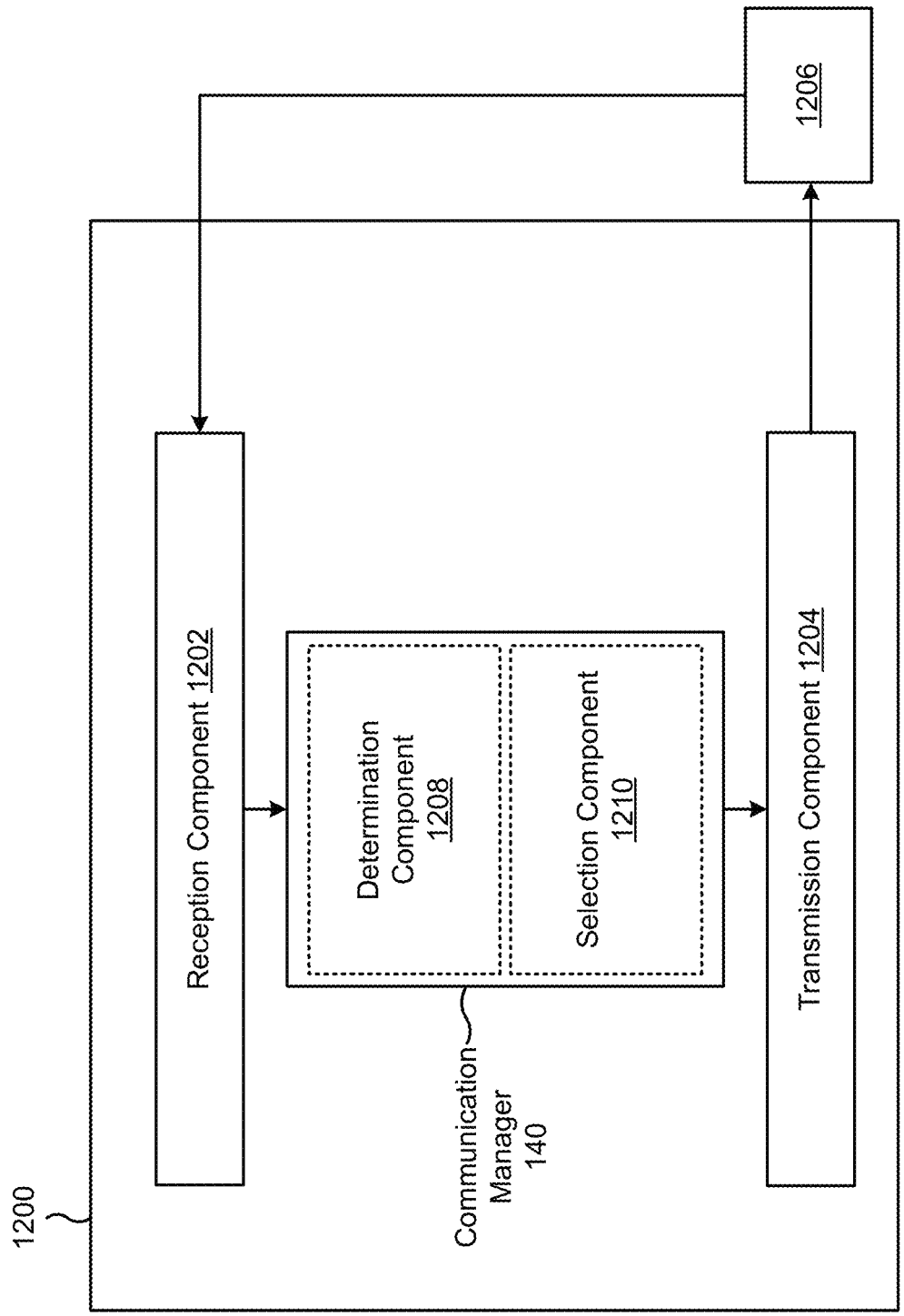

FIG. 12 is a diagram of an example apparatus 1200 for wireless communication in accordance with the present disclosure. The apparatus 1200 may be a UE, or a UE may include the apparatus 1200. In some aspects, the apparatus 1200 includes a reception component 1202, a transmission component 1204, and a communication manager 140, which may be in communication with one another (for example, via one or more buses). As shown, the apparatus 1200 may communicate with another apparatus 1206 (such as a UE, a base station, or another wireless communication device) using the reception component 1202 and the transmission component 1204.

In some aspects, the apparatus 1200 may be configured to perform one or more operations described herein in connection with FIGS. 6-8. Additionally or alternatively, the apparatus 1200 may be configured to perform one or more processes described herein, such as process 1000 of FIG. 10. In some aspects, the apparatus 1200 may include one or more components of the UE described above in connection with FIG. 2.

The reception component 1202 may receive communications, such as reference signals, control information, data communications, or a combination thereof, from the apparatus 1206. The reception component 1202 may provide received communications to one or more other components of the apparatus 1200, such as the communication manager 140. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a modem, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, the communication manager 140 may generate communications and may transmit the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The communication manager 140 may determine whether uplink symbols on a primary component carrier, of a plurality of component carriers for which PUCCH switching is enabled, are sufficient to permit any PUCCH repetition, of a plurality of PUCCH repetitions, to be transmitted in a plurality of consecutive slots on the primary component carrier. The communication manager 140 may select a component carrier, of the plurality of component carriers, that is to be used for transmitting one or more PUCCH repetitions of the plurality of PUCCH repetitions based at least in part on the determination of whether uplink symbols on the primary component carrier are sufficient to permit any PUCCH repetition to be transmitted in the plurality of consecutive slots. The communication manager 140 may transmit or may cause the transmission component 1204 to transmit the one or more PUCCH repetitions on the selected component carrier. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a determination component 1208, a selection component 1210, or a combination thereof. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The determination component 1208 may determine whether uplink symbols on a primary component carrier, of a plurality of component carriers for which PUCCH switching is enabled, are sufficient to permit any PUCCH repetition, of a plurality of PUCCH repetitions, to be transmitted in a plurality of consecutive slots on the primary component carrier. The selection component 1210 may select a component carrier, of the plurality of component carriers, that is to be used for transmitting one or more PUCCH repetitions of the plurality of PUCCH repetitions based at least in part on the determination of whether uplink symbols on the primary component carrier are sufficient to permit any PUCCH repetition to be transmitted in the plurality of consecutive slots. The transmission component 1204 may transmit one or more PUCCH repetitions on the selected component carrier.

The selection component 1210 may select the secondary component carrier based at least in part on at least one of a timing pattern associated with performing PUCCH switching among the plurality of component carriers, or priorities associated with secondary component carriers in the plurality of component carriers.

The transmission component 1204 may refrain from transmitting a PUCCH repetition, of the plurality of PUCCH repetitions, based at least in part on a TDD configuration associated with the selected component carrier.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a UE, comprising: transmitting an initial PUCCH repetition, of a plurality of PUCCH repetitions, on a first component carrier of a plurality of component carriers for which PUCCH switching is enabled; selecting a second component carrier, of the plurality of component carriers for which PUCCH switching is enabled, that is to be used for transmitting a second PUCCH repetition of the plurality of PUCCH repetitions; and transmitting the second PUCCH repetition on the second component carrier.

Aspect 2: The method of Aspect 1, wherein selecting the second component carrier comprises: selecting the first component carrier as the second component carrier based at least in part on a configuration indicating that the second PUCCH repetition is to be transmitted on a same component carrier as the initial PUCCH repetition.

Aspect 3: The method of any of Aspects 1-2, wherein selecting the second component carrier comprises: selecting the second component carrier based at least in part on a timing pattern associated with performing PUCCH switching among the plurality of component carriers.

Aspect 4: The method of Aspect 3, wherein the first component carrier is identified based at least in part on the timing pattern.

Aspect 5: The method of any of Aspects 1-4, wherein selecting the second component carrier comprises: selecting the second component carrier based at least in part on priorities associated with component carriers in the plurality of component carriers.

Aspect 6: The method of any of Aspects 1-5, wherein selecting the second component carrier comprises: selecting the second component carrier based at least in part on a TDD configuration associated with the second component carrier.

Aspect 7: The method of any of Aspects 1-6, wherein selecting the second component carrier comprises: selecting the second component carrier based at least in part on a PUCCH resource configuration associated with the plurality of PUCCH repetitions.

Aspect 8: A method of wireless communication performed by a UE, comprising: determining whether uplink symbols on a primary component carrier, of a plurality of component carriers for which PUCCH switching is enabled, are sufficient to permit any PUCCH repetition, of a plurality of PUCCH repetitions, to be transmitted in a plurality of consecutive slots on the primary component carrier; and selecting a component carrier, of the plurality of component carriers, that is to be used for transmitting one or more PUCCH repetitions of the plurality of PUCCH repetitions, wherein the component carrier is selected based at least in part on the determination of whether uplink symbols on the primary component carrier are sufficient to permit any PUCCH repetition to be transmitted in the plurality of consecutive slots; and transmitting the one or more PUCCH repetitions on the selected component carrier.

Aspect 9: The method of Aspect 8, wherein the primary component carrier is selected as the component carrier based at least in part on a determination that at least one PUCCH repetition can be transmitted in the plurality of consecutive slots on the primary component carrier.

Aspect 10: The method of Aspect 8, wherein a secondary component carrier of the plurality of component carriers is selected as the component carrier based at least in part on a determination that no PUCCH repetitions can be transmitted in the plurality of consecutive slots on the primary component carrier.

Aspect 11: The method of Aspect 10, further comprising selecting the secondary component carrier based at least in part on at least one of: a timing pattern associated with performing PUCCH switching among the plurality of component carriers, or priorities associated with secondary component carriers in the plurality of component carriers.

Aspect 12: The method of any of Aspects 8-11, further comprising refraining from transmitting a PUCCH repetition, of the plurality of PUCCH repetitions, based at least in part on a TDD configuration associated with the selected component carrier.

Aspect 13: An apparatus for wireless communication at a device, comprising a processor; memory coupled with the processor; and instructions stored in the memory and executable by the processor to cause the apparatus to perform the method of one or more of Aspects 1-7.

Aspect 14: A device for wireless communication, comprising a memory and one or more processors coupled to the memory, the one or more processors configured to perform the method of one or more of Aspects 1-7.

Aspect 15: An apparatus for wireless communication, comprising at least one means for performing the method of one or more of Aspects 1-7.

Aspect 16: A non-transitory computer-readable medium storing code for wireless communication, the code comprising instructions executable by a processor to perform the method of one or more of Aspects 1-7.

Aspect 17: A non-transitory computer-readable medium storing a set of instructions for wireless communication, the set of instructions comprising one or more instructions that, when executed by one or more processors of a device, cause the device to perform the method of one or more of Aspects 1-7.

Aspect 18: An apparatus for wireless communication at a device, comprising a processor; memory coupled with the processor; and instructions stored in the memory and executable by the processor to cause the apparatus to perform the method of one or more of Aspects 8-12.

Aspect 19: A device for wireless communication, comprising a memory and one or more processors coupled to the memory, the one or more processors configured to perform the method of one or more of Aspects 8-12.

Aspect 20: An apparatus for wireless communication, comprising at least one means for performing the method of one or more of Aspects 8-12.

Aspect 21: A non-transitory computer-readable medium storing code for wireless communication, the code comprising instructions executable by a processor to perform the method of one or more of Aspects 8-12.

Aspect 22: A non-transitory computer-readable medium storing a set of instructions for wireless communication, the set of instructions comprising one or more instructions that, when executed by one or more processors of a device, cause the device to perform the method of one or more of Aspects 8-12.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
   one or more processors; and
   one or more memories, coupled with the one or more processors, and storing processor-readable code that, when executed by the one or more processors, is configured to cause the UE to:
      transmit an initial physical uplink control channel (PUCCH) repetition, of a plurality of PUCCH repetitions, on a first component carrier of a plurality of component carriers corresponding to a PUCCH group for which PUCCH switching is enabled;
      select a second component carrier, of the plurality of component carriers corresponding to the PUCCH group for which PUCCH switching is enabled, that is to be used for transmitting a second PUCCH repetition of the plurality of PUCCH repetitions; and
      transmit the second PUCCH repetition on the second component carrier.

2. The UE of claim 1, wherein, to cause the UE to select the second component carrier, the processor-readable code, when executed by the one or more processors, is configured to cause the UE to:
   select the first component carrier as the second component carrier based at least in part on a configuration indicating that the second PUCCH repetition is to be transmitted on a same component carrier as the initial PUCCH repetition.

3. The UE of claim 1, wherein, to cause the UE to select the second component carrier, the processor-readable code, when executed by the one or more processors, is configured to cause the UE to:
   select the second component carrier based at least in part on a timing pattern associated with performing PUCCH switching among the plurality of component carriers.

4. The UE of claim 3, wherein the first component carrier is identified based at least in part on the timing pattern.

5. The UE of claim 1, wherein, to cause the UE to select the second component carrier, the processor-readable code, when executed by the one or more processors, is configured to cause the UE to:
   select the second component carrier based at least in part on priorities associated with component carriers in the plurality of component carriers.

6. The UE of claim 1, wherein, to cause the UE to select the second component carrier, the processor-readable code, when executed by the one or more processors, is configured to cause the UE to:
   select the second component carrier based at least in part on a time domain duplex (TDD) configuration associated with the second component carrier.

7. The UE of claim 1, wherein, to cause the UE to select the second component carrier, the processor-readable code, when executed by the one or more processors, is configured to cause the UE to:
   select the second component carrier based at least in part on a PUCCH resource configuration associated with the plurality of PUCCH repetitions.

8. A user equipment (UE) for wireless communication, comprising:
   one or more processors; and
   one or more memories, coupled with the one or more processors, and storing processor-readable code that, when executed by the one or more processors, is configured to cause the UE to:
      determine whether uplink symbols on a primary component carrier, of a plurality of component carriers for which physical uplink control channel (PUCCH) switching is enabled, are sufficient to permit any PUCCH repetition, of a plurality of PUCCH repetitions, to be transmitted in a plurality of consecutive slots on the primary component carrier;
      select a component carrier, of the plurality of component carriers, that is to be used for transmitting one or more PUCCH repetitions of the plurality of PUCCH repetitions based at least in part on the determination of whether uplink symbols on the primary component carrier are sufficient to permit any PUCCH repetition of the plurality of PUCCH repetitions to be transmitted in the plurality of consecutive slots; and
      transmit the one or more PUCCH repetitions on the selected component carrier.

9. The UE of claim 8, wherein the primary component carrier is selected as the component carrier based at least in part on a determination that at least one PUCCH repetition can be transmitted in the plurality of consecutive slots on the primary component carrier.

10. The UE of claim 8, wherein a secondary component carrier of the plurality of component carriers is selected as the component carrier based at least in part on a determination that no PUCCH repetitions can be transmitted in the plurality of consecutive slots on the primary component carrier.

11. The UE of claim 10, wherein the one or more memories further stores processor-readable code configured to cause the UE to select the secondary component carrier based at least in part on at least one of:
   a timing pattern associated with performing PUCCH switching among the plurality of component carriers, or
   priorities associated with secondary component carriers in the plurality of component carriers.

12. The UE of claim 8, wherein the one or more memories further stores processor-readable code configured to cause the UE to refrain from transmitting a PUCCH repetition, of the plurality of PUCCH repetitions, based at least in part on a time domain duplex (TDD) configuration associated with the selected component carrier.

13. A method of wireless communication performed by a user equipment (UE), comprising:
   transmitting an initial physical uplink control channel (PUCCH) repetition, of a plurality of PUCCH repetitions, on a first component carrier of a plurality of component carriers corresponding to a PUCCH group for which PUCCH switching is enabled;
   selecting a second component carrier, of the plurality of component carriers corresponding to the PUCCH group for which PUCCH switching is enabled, that is to be used for transmitting a second PUCCH repetition of the plurality of PUCCH repetitions; and
   transmitting the second PUCCH repetition on the second component carrier.

14. The method of claim 13, wherein selecting the second component carrier comprises:
   selecting the first component carrier as the second component carrier based at least in part on a configuration indicating that the second PUCCH repetition is to be transmitted on a same component carrier as the initial PUCCH repetition.

15. The method of claim 13, wherein selecting the second component carrier comprises:
    selecting the second component carrier based at least in part on a timing pattern associated with performing PUCCH switching among the plurality of component carriers.

16. The method of claim 15, wherein the first component carrier is identified based at least in part on the timing pattern.

17. The method of claim 13, wherein selecting the second component carrier comprises:
    selecting the second component carrier based at least in part on priorities associated with component carriers in the plurality of component carriers.

18. The method of claim 13, wherein selecting the second component carrier comprises:
    selecting the second component carrier based at least in part on a time domain duplex (TDD) configuration associated with the second component carrier.

19. The method of claim 13, wherein selecting the second component carrier comprises:
    selecting the second component carrier based at least in part on a PUCCH resource configuration associated with the plurality of PUCCH repetitions.

20. A method of wireless communication performed by a user equipment (UE), comprising:
    determining whether uplink symbols on a primary component carrier, of a plurality of component carriers for which physical uplink control channel (PUCCH) switching is enabled, are sufficient to permit any PUCCH repetition, of a plurality of PUCCH repetitions, to be transmitted in a plurality of consecutive slots on the primary component carrier;
    selecting a component carrier, of the plurality of component carriers, that is to be used for transmitting one or more PUCCH repetitions of the plurality of PUCCH repetitions based at least in part on the determination of whether uplink symbols on the primary component carrier are sufficient to permit any PUCCH repetition of the plurality of PUCCH repetitions to be transmitted in the plurality of consecutive slots; and
    transmitting the one or more PUCCH repetitions on the selected component carrier.

21. The method of claim 20, wherein the primary component carrier is selected as the component carrier based at least in part on a determination that at least one PUCCH repetition can be transmitted in the plurality of consecutive slots on the primary component carrier.

22. The method of claim 20, wherein a secondary component carrier of the plurality of component carriers is selected as the component carrier based at least in part on a determination that no PUCCH repetitions can be transmitted in the plurality of consecutive slots on the primary component carrier.

23. The method of claim 22, further comprising selecting the secondary component carrier based at least in part on at least one of:
    a timing pattern associated with performing PUCCH switching among the plurality of component carriers, or
    priorities associated with secondary component carriers in the plurality of component carriers.

24. The method of claim 20, further comprising refraining from transmitting a PUCCH repetition, of the plurality of PUCCH repetitions, based at least in part on a time domain duplex (TDD) configuration associated with the selected component carrier.

* * * * *